United States Patent
Ito

(10) Patent No.: US 9,760,470 B2
(45) Date of Patent: Sep. 12, 2017

(54) DEVICE, METHOD, AND PROGRAM ANALYSIS OF NEW SOURCE CODE TO BE ADDED TO EXECUTION PROGRAM TO CHECK FOR BUG

(71) Applicant: MITSUBISHI ELECTRIC CORPORATION, Tokyo (JP)

(72) Inventor: Masuo Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/781,553

(22) PCT Filed: May 15, 2013

(86) PCT No.: PCT/JP2013/063549
§ 371 (c)(1),
(2) Date: Sep. 30, 2015

(87) PCT Pub. No.: WO2014/184896
PCT Pub. Date: Nov. 20, 2014

(65) Prior Publication Data
US 2016/0055074 A1    Feb. 25, 2016

(51) Int. Cl.
*G06F 9/44* (2006.01)
*G06F 11/36* (2006.01)

(52) U.S. Cl.
CPC ............ *G06F 11/3612* (2013.01); *G06F 8/30* (2013.01); *G06F 11/3604* (2013.01)

(58) Field of Classification Search
None
See application file for complete search history.

(56) References Cited

U.S. PATENT DOCUMENTS

| 5,673,387 A | 9/1997 | Chen et al. |
| 2004/0025083 A1* | 2/2004 | Nanja ............... G06F 11/3684 714/35 |
| 2005/0022176 A1* | 1/2005 | Ramachandran ....... G06F 8/65 717/170 |
| 2006/0041864 A1* | 2/2006 | Holloway ........... G06F 11/3688 717/124 |

(Continued)

FOREIGN PATENT DOCUMENTS

| CN | 102023918 A | 4/2011 |
| JP | 4-44176 A | 2/1992 |

(Continued)

*Primary Examiner* — Insun Kang
(74) *Attorney, Agent, or Firm* — Birch, Stewart, Kolasch & Birch, LLP

(57) ABSTRACT

An application list reading part 220 reads an application list 122. An application collecting part 230 acquires a source code 111 of an installed application indicated by the application list 122. The application collecting part 230 also acquires a source code 111 of an additional application. A program analyzing part 240 performs program analysis concerning a new execution program 123 using the source codes 111. If a bug will not occur in the new execution program 123, a program creating part 250 creates a new execution program 123. Then, a program updating part 260 writes the new execution program 123 to an electronic control device 121 and adds an additional application name to the application list 122.

11 Claims, 22 Drawing Sheets

(56) References Cited

U.S. PATENT DOCUMENTS

| | | | | |
|---|---|---|---|---|
| 2007/0033273 A1* | 2/2007 | White | ................. | G06F 8/30 709/223 |
| 2007/0198970 A1 | 8/2007 | Horii et al. | | |
| 2008/0178154 A1* | 7/2008 | Basler | ................. | G06F 8/20 717/124 |
| 2010/0192220 A1* | 7/2010 | Heizmann | ........... | G06F 11/3664 726/19 |
| 2011/0202905 A1* | 8/2011 | Mahajan | ................... | G06F 8/43 717/140 |
| 2012/0324417 A1* | 12/2012 | Somani | ................... | G06F 8/30 717/101 |

FOREIGN PATENT DOCUMENTS

| | | |
|---|---|---|
| JP | 6-59871 A | 3/1994 |
| JP | 7-210424 A | 8/1995 |
| JP | 8-44590 A | 2/1996 |
| JP | 10-63536 A | 3/1998 |
| JP | 11-296406 A | 10/1999 |
| JP | 2000-284952 A | 10/2000 |
| JP | 2004-272830 A | 9/2004 |
| JP | 2007-4255 A | 1/2007 |
| JP | 2007-172269 A | 7/2007 |
| JP | 2007-249495 A | 9/2007 |
| JP | 2007-257478 A | 10/2007 |
| JP | 2008-191963 A | 8/2008 |
| JP | 2010-67188 A | 3/2010 |
| JP | 2010-157108 A | 7/2010 |
| JP | 2011-113296 A | 6/2011 |

\* cited by examiner

Fig. 15

292: SECOND STRUCTURAL DESIGN FILE

| ATTRIBUTE VALUE | VARIABLE NAME |
|---|---|
| | X |
| ATTRIBUTE (1) : 1-CYCLE-DELAY READING ATTRIBUTE | SUBROUTINE (c) |
| ATTRIBUTE (2) : WRITING ATTRIBUTE | SUBROUTINE (b) |
| ATTRIBUTE (3) : NORMAL-CYCLE READING ATTRIBUTE | SUBROUTINE (a) |

Fig.18

291: FIRST STRUCTURAL DESIGN FILE

| ATTRIBUTE VALUE | SUBROUTINE NAME | | | | |
|---|---|---|---|---|---|
| | (a) | (B) | (c) | (d) | (e) |
| ATTRIBUTE (1): 1-CYCLE-DELAY READING ATTRIBUTE | | | X | Y | |
| ATTRIBUTE (2): WRITING ATTRIBUTE | | X | | | Y |
| ATTRIBUTE (3): NORMAL-CYCLE READING ATTRIBUTE | X | | | | X |

Fig.19

292: SECOND STRUCTURAL DESIGN FILE

| ATTRIBUTE VALUE | VARIABLE NAME | |
|---|---|---|
| | X | Y |
| ATTRIBUTE (1): 1-CYCLE-DELAY READING ATTRIBUTE | SUBROUTINE (c) | SUBROUTINE (d) |
| ATTRIBUTE (2): WRITING ATTRIBUTE | SUBROUTINE (b) | SUBROUTINE (e) |
| ATTRIBUTE (3): NORMAL-CYCLE READING ATTRIBUTE | SUBROUTINE (a) SUBROUTINE (e) | — |

Fig. 20

293: THIRD STRUCTURAL DESIGNE FILE

| ATTRIBUTE VALUE | VARIABLE NAME | |
|---|---|---|
| | X | Y |
| ATTRIBUTE (1)<br>[TYPE I] | SUBROUTINE (c) | SUBROUTINE (d) |
| ATTRIBUTE (1) / (2)<br>[TYPE II] | — | — |
| ATTRIBUTE (2)<br>[TYPE III] | SUBROUTINE (b) | — |
| ATTRIBUTE (2) / (3)<br>[TYPE IV] | SUBROUTINE (e) | SUBROUTINE (e) |
| ATTRIBUTE (3)<br>[TYPE V] | SUBROUTINE (a) | — |

Fig. 22

291: FIRST STRUCTURAL DESIGN FILE

| ATTRIBUTE VALUE | SUBROUTINE NAME | | | | | |
|---|---|---|---|---|---|---|
| | (a) | (B) | (c) | (d) | (e) | (f) |
| ATTRIBUTE (1): 1-CYCLE-DELAY READING ATTRIBUTE | | | X | Y | | (X) |
| ATTRIBUTE (2): WRITING ATTRIBUTE | | X | | | Y | X |
| ATTRIBUTE (3): NORMAL-CYCLE READING ATTRIBUTE | X | | | | X | Y |

Fig. 23

291: FIRST STRUCTURAL DESIGN FILE

| ATTRIBUTE VALUE | SUBROUTINE NAME | | | | | |
|---|---|---|---|---|---|---|
| | (a) | (B) | (c) | (d) | (e) | (f) |
| ATTRIBUTE (1): 1-CYCLE-DELAY READING ATTRIBUTE | | | X | Y | Y | X |
| ATTRIBUTE (2): WRITING ATTRIBUTE | | X | | | | (X) (Y) |
| ATTRIBUTE (3): NORMAL-CYCLE READING ATTRIBUTE | X | | | | X | Y |

Fig. 24

291:FIRST STRUCTURAL DESIGN FILE

| ATTRIBUTE VALUE | SUBROUTINE NAME | | | | | |
|---|---|---|---|---|---|---|
| | (a) | (B) | (c) | (d) | (e) | (f) |
| ATTRIBUTE (1) : 1-CYCLE-DELAY READING ATTRIBUTE | | | X | Y | Y | X |
| ATTRIBUTE (2) : WRITING ATTRIBUTE | | X | | | X | Y |
| ATTRIBUTE (3) : NORMAL-CYCLE READING ATTRIBUTE | X | | | | | (Y) |

DEVICE, METHOD, AND PROGRAM ANALYSIS OF NEW SOURCE CODE TO BE ADDED TO EXECUTION PROGRAM TO CHECK FOR BUG

TECHNICAL FIELD

The present invention to a program analysis device, a program analysis method, and a program analysis program.

BACKGROUND ART

An analysis tool is executed at a program source code or an execution type program in order to detect a problematic portion of a developed program.

The designer of the program determines whether or not a bug exists in the program based on an analysis result, and feeds back the determination result to the program design.

A sufficient program analysis cannot be performed unless all source codes that constitute the program are available.

More specifically, when adding a program for providing an additional function on an existing program, program analysis need be practiced at all combinations of programs to be added and the existing program.

Therefore, if the programs to be added increase, a huge number of combinations as an analysis target are resulted, and very large workload is necessary for the program analysis.

An alarm content outputted by the program analysis tool includes a content intended by the designer, namely, a content that does not lead to a program bug, in addition to a content that leads to a program bug. However, the content that leads to the program bug and the content that does not lead to the program bug cannot be separated automatically.

CITATION LIST

Patent Literature

Patent Literature 1: JP 07-210424

SUMMARY OF INVENTION

Technical Problem

It is, for example, an object of the present invention to facilitate program analysis concerning a new execution program to which a new partial program has been added.

Solution to Problem

A program analysis device according to the present invention includes:

a list acquiring part to acquire a partial program list indicating a partial program which constitutes an execution program;

a source code acquiring part to acquire a source code of the partial program indicated by the partial program list acquired by the list acquiring part, and a source code of a new partial program to be added to the execution program; and a program analyzing part to determine whether or not a bug will occur in a new execution program that includes the new partial program, using the source code acquired by the source code acquiring part, of the partial program and the source code acquired by the source code acquiring part, of the new partial program.

Advantageous Effects of Invention

According to the present invention, program analysis concerning a new execution program to which a new partial program has been added can be performed easily by acquiring the source code of the partial program and the source code of the new partial program.

BRIEF DESCRIPTION OF DRAWINGS

FIG. 15 is a diagram illustrating an example of a second structural design file 292 according to Embodiment 4.

FIG. 18 is a diagram illustrating an example of a first structural design file 291 according to Embodiment 6.

FIG. 19 is a diagram illustrating an example of a second structural design file 292 according to Embodiment 6.

FIG. 20 is a diagram illustrating an example of a third structural design file 293 according to Embodiment 6.

FIG. 22 is a diagram illustrating an example of a first structural design file 291 according to Embodiment 7.

FIG. 23 is a diagram illustrating an example of the first structural design file 291 according to Embodiment 7.

FIG. 24 is a diagram illustrating an example of the first structural design file 291 according to Embodiment 7.

DESCRIPTION OF EMBODIMENTS

Embodiment 1.

An embodiment will be described in which program analysis is performed concerning a new execution program to which a new partial program has been added.

Figure 1:
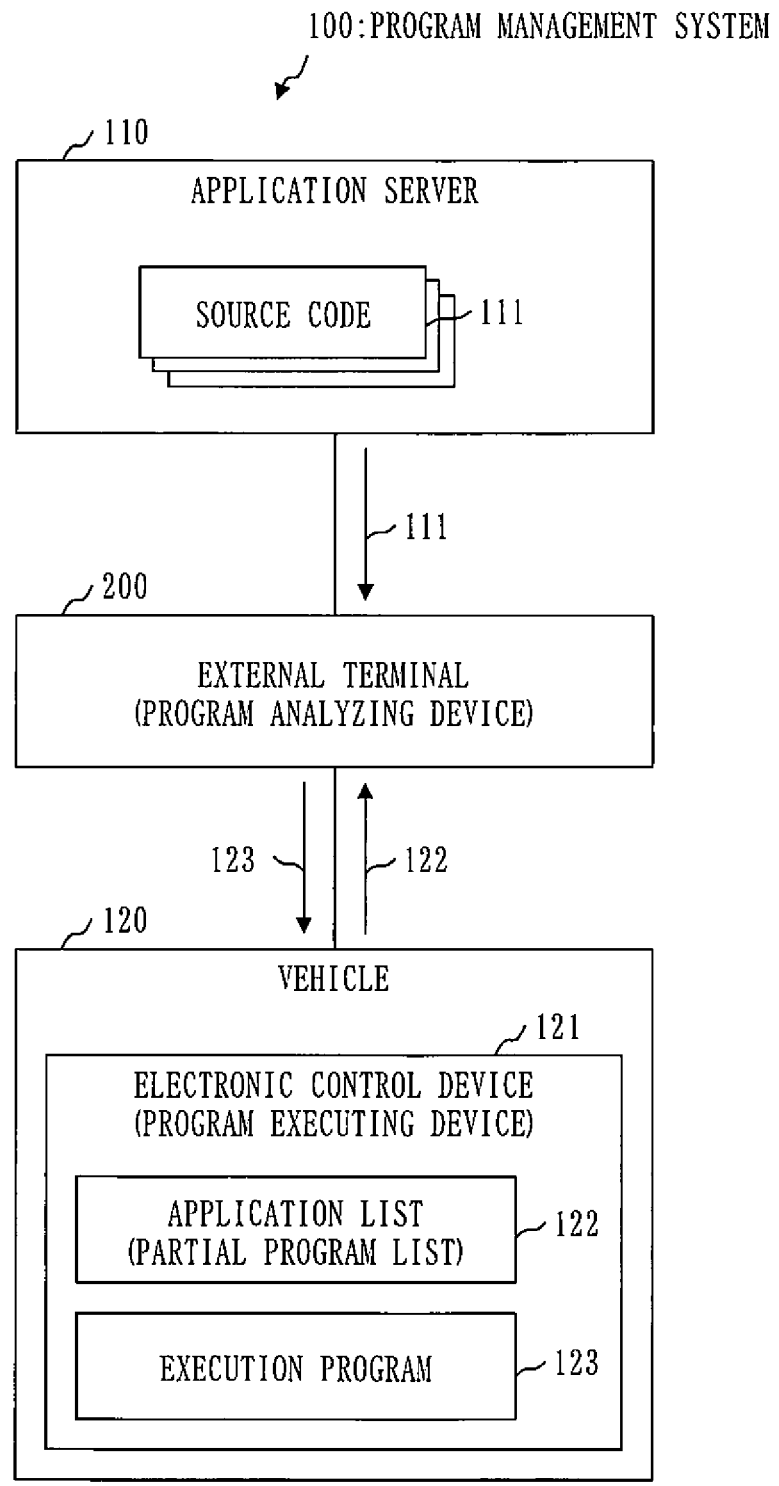
FIG. 1 is a configuration diagram of a program management system 100 according to Embodiment 1.

FIG. 1 is a configuration diagram of a program management system 100 according to Embodiment 1.

The configuration of the program management system 100 according to Embodiment 1 will be described with reference to FIG. 1.

The program management system 100 includes an application server 110, a vehicle 120, and an external terminal 200 (an example of a program analysis device). The vehicle 120 includes an electronic control device 121 (an example of a program execution device) which controls the vehicle 120. Note that the electronic control device 121 may be a device that performs an information process other than vehicle control.

The external terminal 200 communicates with the application server 110 and the vehicle 120 in a wire-line or wireless manner.

The electronic control device 121 stores an application list 122 (an example of a partial program list) and an execution program 123.

The execution program 123 is an execution-type program for controlling, for example, the vehicle 120.

The application list 122 is data indicating the name of an application program (an example of the partial program) constituting the execution program 123.

The application program constituting the execution program 123 will be referred to as "installed application" hereinafter.

When adding an application program to the electronic control device 121, that is, when adding-on or plugging-in an application program, the external terminal 200 operates as follows.

The application program to be added will be referred to as "additional application" hereinafter, and the execution program 123 to which the application program has been added will be referred to as "new execution program 123" hereinafter.

(1) The external terminal 200 acquires the application list 122 from the electronic control device 121.

(2) The external terminal 200 acquires source codes 111 of the installed application which is identified by an application name indicated by the application list 122, from the application server 110.

The external terminal 200 also acquires source codes 111 of the additional application from the application server 110.

(3) Using the source codes 111 of the additional application and the source codes 111 of the installed application, the external terminal 200 performs program analysis concerning the new execution program 123. In the program analysis, whether or not a bug will occur in the new execution program 123 is determined.

(4) If it is determined that a bug will not occur in the new execution program 123, the external terminal 200 creates the new execution program 123 and updates the execution program 123 stored in the electronic control device 121, with the new execution program 123. The external terminal 200 also adds the application name of the additional application to the application list 122.

With the above operation, whether or not a bug will occur in the new execution program 123 if an application program is added can be determined.

Figure 2:
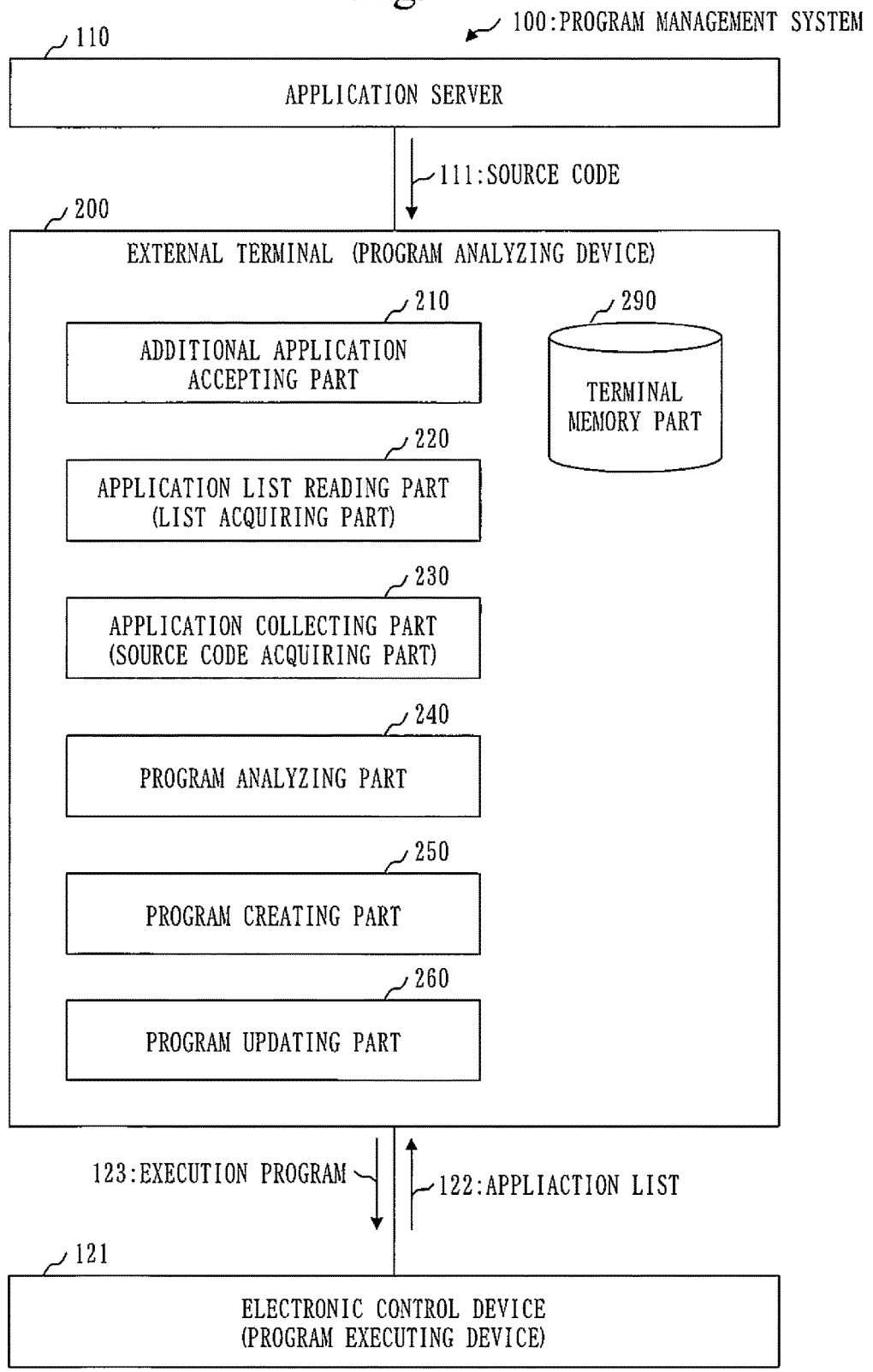
FIG. 2 is a functional configuration diagram of an external terminal 200 according to Embodiment 1.

FIG. 2 is a functional configuration diagram of the external terminal 200 according to Embodiment 1.

The functional configuration of the external terminal 200 according to Embodiment 1 will be described with reference to FIG. 2.

The external terminal 200 includes an additional application accepting part 210, an application list reading part 220 (an example of a list acquiring part), and an application collecting part 230 (an example of a source code acquiring part).

The external terminal 200 includes a program analyzing part 240, a program creating part 250, a program updating part 260, and a terminal memory part 290.

The additional application accepting part 210 accepts an application program addition request for the electronic control device 121.

The application list reading part 220 reads the application list 122 from the electronic control device 121.

The application collecting part 230 downloads the source codes 111 of the installed application identified by the application name indicated in the application list 122, from the application server 110. The application collecting part 230 also downloads the source codes 111 of the additional application from the application server 110.

Using the source codes 111 of the additional application and the source codes 111 of the installed application, the program analyzing part 240 performs program analysis concerning the new execution program 123.

The program creating part 250 creates the new execution program 123 if it is determined that a bug will not occur in the new execution program 123.

The program updating part 260 updates the execution program 123 stored in the electronic control device 121, with the new execution program 123. The program updating part 260 also adds the application name of the additional application to the application list 122.

The terminal memory part 290 stores data to be used by the external terminal 200.

For example, the terminal memory part 290 stores the application list 122, the source codes 111 of the additional application, the source codes 111 of the installed application, the new execution program 123, and the like.

Figure 3:
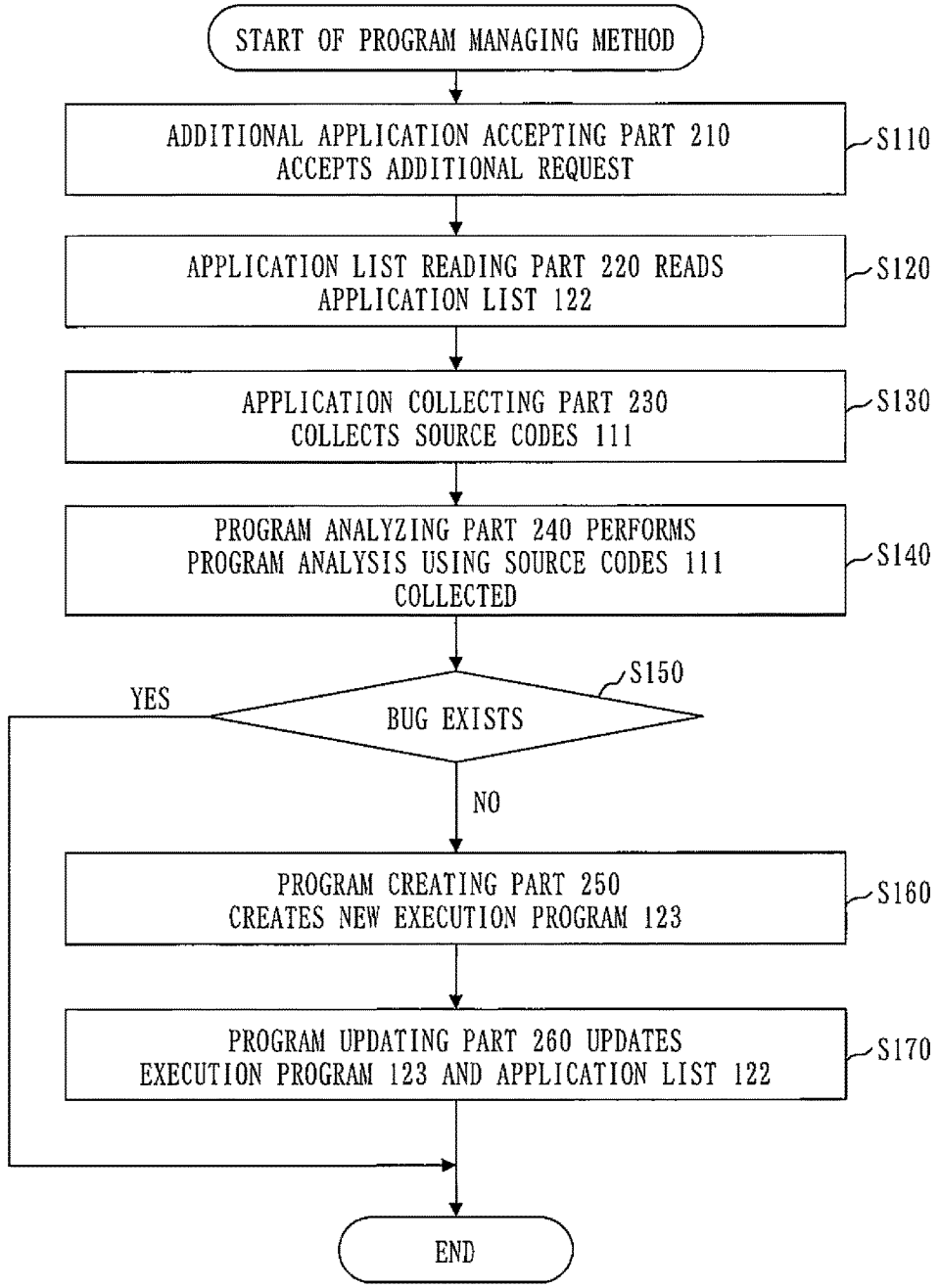
FIG. 3 is a flowchart expressing the flow of process of a program management method according to Embodiment 1.

FIG. 3 is a flowchart expressing the flow of process of a program management method according to Embodiment 1.

The program management method according to Embodiment 1 will be described with reference to FIG. 3.

Assume that the source codes 111 of the developed application are stored in the application server 110 in advance.

If the source codes 111 are written in the C language, the extension of a file in which the source codes 111 are described is ".c" or ".h".

In S110, the user inputs an application addition request for the electronic control device 121 to the external terminal 200. For example, the dealer (an example of the user) of the vehicle 120 inputs an application addition request to the external terminal 200.

The additional application accepting part 210 of the external terminal 200 accepts the application addition request.

Note that the application addition request includes the application name (an example of the identifier) of the additional application to be added to the electronic control device 121.

After S110, the process advances to S120.

In S120, the application list reading part 220 communicates with the electronic control device 121. The application list reading part 220 then reads the application list 122 from the electronic control device 121.

After S120, the process advances to S130.

In S130, the application collecting part 230 communicates with the application server 110.

The application collecting part 230 downloads the source codes 111 of the additional application identified by the application name included in the addition request inputted in S110, from the application server 110.

The application collecting part 230 also downloads the source codes 111 of the installed application identified by the application name indicated by the application list 122 which has been read in S120, from the application server 110.

After S130, the process advances to S140.

In S140, using the source codes 111 of the additional application and the source codes 111 of the installed application which have been downloaded in S130, the program analyzing part 240 performs program analysis concerning the new execution program 123. The program analyzing part 240 then obtains an analysis result indicating whether or not a bug will occur in the new execution program 123.

For example, the program analyzing part 240 performs program analysis statically or dynamically by executing a conventional program analysis tool.

Overflow, underflow, presence/absence of division by 0 or access exception, presence/absence of a recursive call for a module (to be also referred to as a routine), inconsistency of limitation for interruption, and the like are examples of the analysis content.

After S140, the process advances to S150.

In S150, the process branches according to the analysis result of S140.

If an analysis result that a bug will occur in the new execution program 123 is obtained (YES), the additional application accepting part 210 displays an error message notifying that the application cannot be added, and the process of the program management method ends.

If an analysis result that a bug will not occur in the new execution program 123 is obtained (NO), the process advances to S160.

In S160, the program creating part 250 creates the new execution program 123.

For example, the program creating part 250 compiles the source codes 111 of the additional application and the source codes 111 of the installed application. The program creating part 250 then links object files created by compiling. The new execution program 123 is created by linking the object files.

After S160, the process advances to S170.

In S170, the program updating part 260 communicates with the electronic control device 121.

The program updating part 260 updates the execution program 123 stored in the electronic control device 121, with the new execution program 123 created in S160.

The program updating part 260 also adds the application name of the additional application to the application list 122 stored in the electronic control device 121.

The additional application accepting part 210 displays an end message notifying that addition of the application is ended, on the display part of the external terminal 200.

After S170, the process of the program management method ends.

Figure 4:
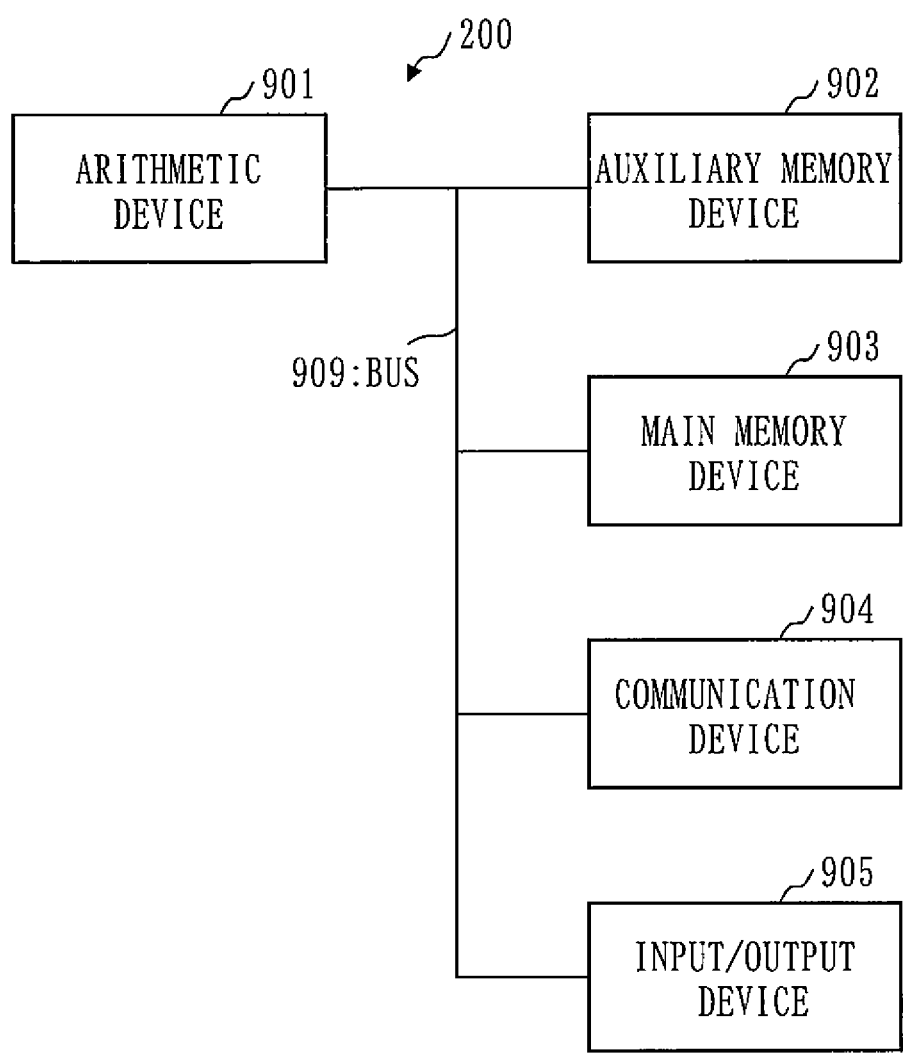
FIG. 4 is a diagram illustrating an example of the hardware configuration of the external terminal 200 according to Embodiment 1.

FIG. 4 is a diagram illustrating an example of the hardware configuration of the external terminal 200 according to Embodiment 1.

An example of the hardware configuration of the external terminal 200 according to Embodiment 1 will be described with reference to FIG. 4.

The external terminal 200 is a computer including an arithmetic device 901, an auxiliary memory device 902, a main memory device 903, a communication device 904, and an input/output device 905.

The arithmetic device 901, the auxiliary memory device 902, the main memory device 903, the communication device 904, and the input/output device 905 are connected to a bus 909.

The arithmetic device 901 is a CPU (Central Processing Unit) which executes a program.

The auxiliary memory device 902 is, for example, a ROM (Read Only Memory), a flash memory, or a hard disk device.

The main memory device 903 is, for example, a RAM (Random Access Memory).

The communication device 904 communicates via the Internet, a LAN (Local Area Network), a telephone network, or other network in a wire-line or wireless manner.

The input/output device 905 is, for example, a mouse, a keyboard, or a display device.

The program is usually stored in the auxiliary memory device 902, and is loaded in the main memory device 903, read by the arithmetic device 901, and executed by the arithmetic device 901.

For example, an operation system (OS) is stored in the auxiliary memory device 902. A program (an example of a program analysis program) that implements the function explained as a "part" is stored in the auxiliary memory device 902. The OS and the program which implements the function explained as the "part" are loaded in the main memory device 903 and executed by the arithmetic device 901.

Information, data, signal values, or variable values representing the results of processes such as to "decide", "determine", "extract", "detect", "set", "register", "select", "create", "input", "output", and the like are stored, in the form of files, in the main memory device 903 or auxiliary memory device 902. Other data to be used by the external terminal 200 are stored in the main memory device 903 or auxiliary memory device 902.

FIG. 4 illustrates an example of the hardware configuration of the external terminal 200 according to Embodiment 1. The hardware configuration of the external terminal 200 may be different from the configuration illustrated in FIG. 4.

The method (an example of the program analysis method) according to Embodiment 1 can be implemented by the procedure explained using the flowcharts and the like, or by a procedure partly different from that procedure.

According to Embodiment 1, program analysis concerning the new execution program 123 can be performed easily by collecting the source codes 111 of the installed application and the source codes 111 of the additional application.

Since the program analysis is performed after the source codes required for implementation of the new execution program 123 are prepared, program analysis need be performed only once. That is, the workload of the program analysis can be reduced.

Embodiment 2.

An embodiment will be described in which the result of past program analysis is utilized.

Matters that are different from Embodiment 1 will mainly be described hereinafter. Matters that are not described are the same as in Embodiment 1.

Figure 5:
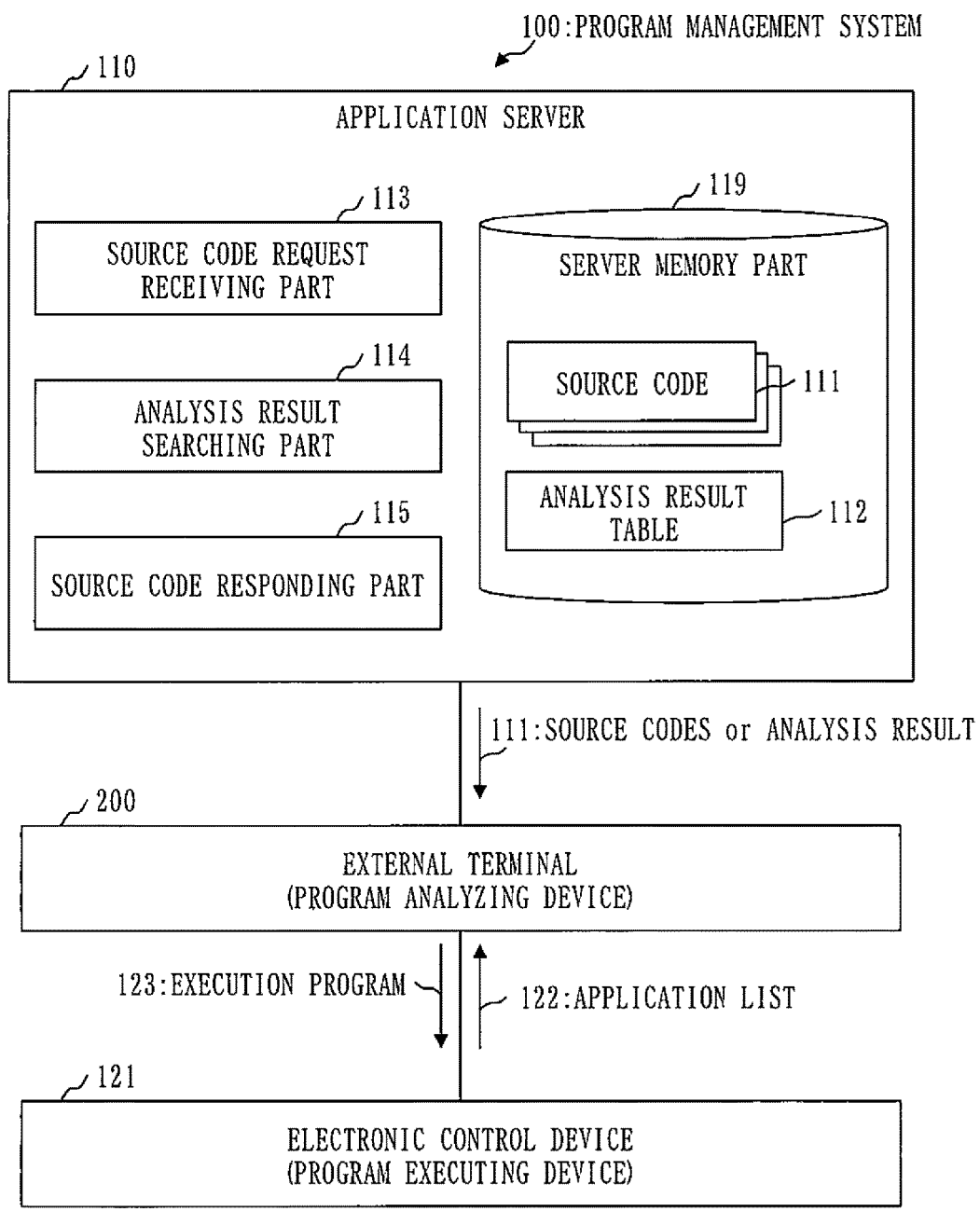
FIG. 5 is a functional configuration diagram of an application server 110 according to Embodiment 2.

FIG. 5 is a functional configuration diagram of an application server 110 according to Embodiment 2.

The functional configuration of the application server 110 according to Embodiment 2 will be described with reference to FIG. 5.

The application server 110 includes a source code request receiving part 113, an analysis result searching part 114, a source code responding part 115, and a server memory part 119.

The server memory part 119 stores data to be used by the application server 110.

For example, the server memory part 119 stores the source codes 111 and an analysis result table 112.

The analysis result table 112 is a table that correlates the analysis result of the program with the application names of the plurality of applications constituting the program.

The operations of the source code request receiving part 113, analysis result searching part 114, and source code responding part 115 will be described hereinafter.

Figure 6:
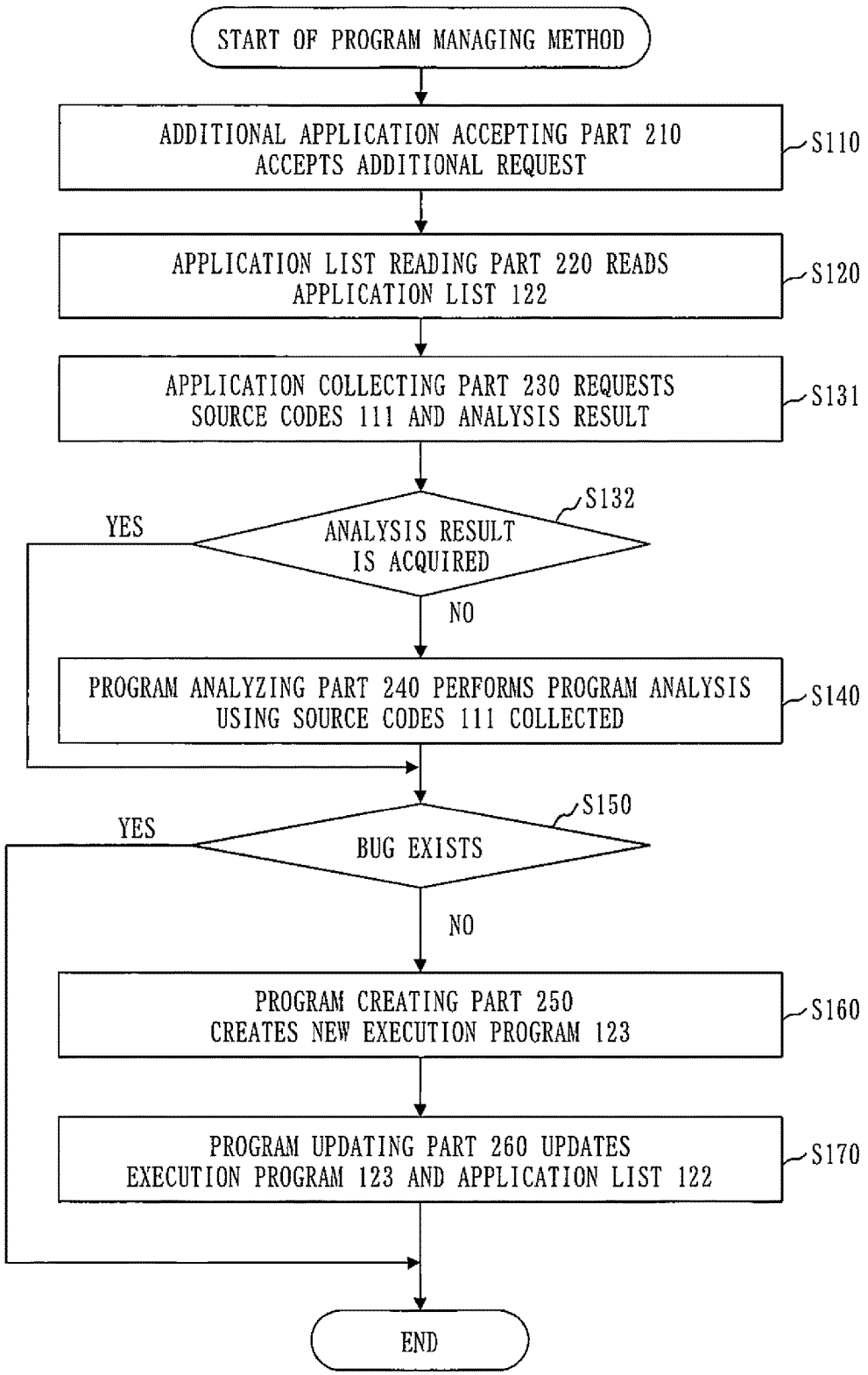
FIG. 6 is a flowchart expressing the flow of process of a program management method according to Embodiment 2.

FIG. 6 is a flowchart expressing the flow of process of a program management method according to Embodiment 2.

The program management method according to Embodiment 2 will be described with reference to FIG. 6.

The external terminal 200 executes S131 and S132 in place of S130 explained in Embodiment 1 (see FIG. 3).

In S131, the application collecting part 230 of the external terminal 200 transmits a source code request for requesting the source codes 111 of the additional application and the source codes 111 of the installed application, to the application server 110. The source code request includes the application names of the additional application and installed application constituting a new execution program 123.

The source code request receiving part 113 of the application server 110 receives the source code request from the external terminal 200.

The analysis result searching part 114 of the application server 110 acquires the application name of the additional application and the application name of the installed application from the source code request. The analysis result searching part 114 then determines whether or not the analysis result correlated with the application name of the additional application and the application name of the installed application is set in the analysis result table 112.

If a relevant analysis result is set in the analysis result table 112, the source code responding part 115 of the application server 110 transmits the relevant analysis result, the source codes 111 of the additional application, and the source codes 111 of the installed application to the external terminal 200. Then, the application collecting part 230 of the external terminal 200 receives the analysis result and the source codes 111 transmitted from the application server 110. Note that if the analysis result indicates that a bug will occur, the source codes 111 need not be communicated.

If a relevant analysis result is not set in the analysis result table 112, the source code responding part 115 of the application server 110 transmits the source codes 111 of the additional application and the source codes 111 of the installed application to the external terminal 200. Then, the application collecting part 230 of the external terminal 200 receives the source codes 111 transmitted from the application server 110.

After S131, the process advances to S132.

In S132, the program analyzing part 240 of the external terminal 200 determines whether or not an analysis result is acquired in S131.

If an analysis result can be acquired (YES), the process advances to S150.

If an analysis result cannot be acquired (NO), the process advances to S140.

In S140, the program analyzing part 240 of the external terminal 200 performs program analysis using the source codes 111 acquired in S131 (the same as in Embodiment 1).

After S140, the process advances to S150.

In S150, the process branches according to the analysis result obtained in S140 or the analysis result obtained in S131.

Except for this, the process is the same as in Embodiment 1.

According to Embodiment 2, an overlapping program analysis is omitted, thereby reducing the load of the external terminal 200.

In place of the application server 110, the external terminal 200 may store the analysis result table 112. If the relevant analysis result is set in the analysis result table 112, the external terminal 200 does not perform program analysis (S140) but utilizes the analysis result set in the analysis result table 112.

Embodiment 3.

An embodiment will be described in which the application server 110 performs program analysis and program creation on behalf of the external terminal 200.

Matters that are different from Embodiment 1 will mainly be described hereinafter. Matters that are not described are the same as in Embodiment 1.

Figure 7:
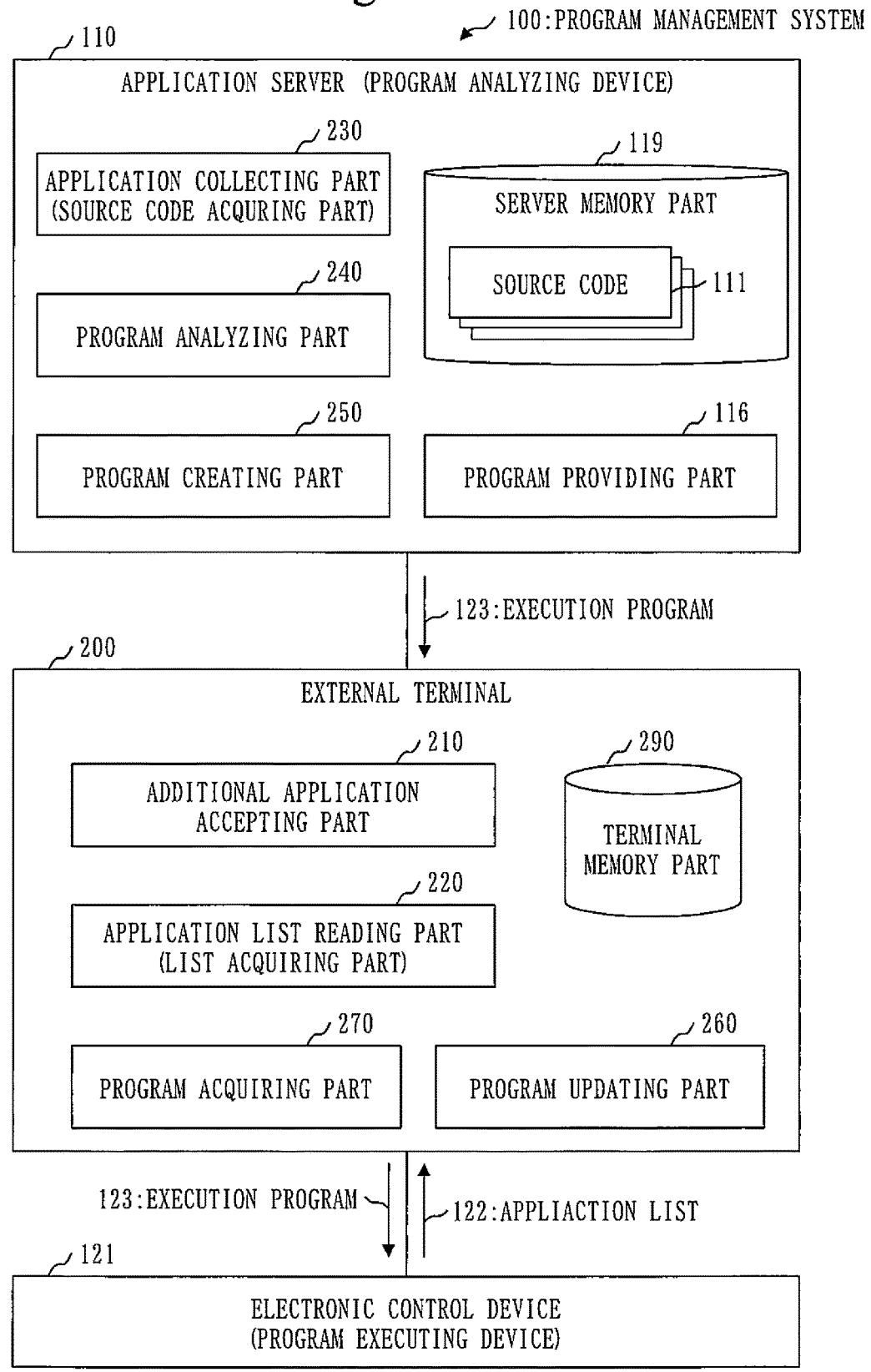
FIG. 7 is a functional configuration diagram of a program management system 100 according to Embodiment 3.

FIG. 7 is a functional configuration diagram of a program management system 100 according to Embodiment 3.

The functional configuration of the program management system 100 according to Embodiment 3 will be described with reference to FIG. 7.

An application server 110 (an example of a program analysis device) includes an application collecting part 230, a program analyzing part 240, and a program creating part 250 on behalf of the external terminal 200.

The application server 110 includes a program providing part 116 which provides a new execution program 123 to an external terminal 200.

The application server 110 includes a server memory part 119 which stores data (for example, source codes 111) which is used in the application server 110.

The external terminal 200 includes a program acquiring part 270 which acquires the new execution program 123 from the application server 110.

Figure 8:
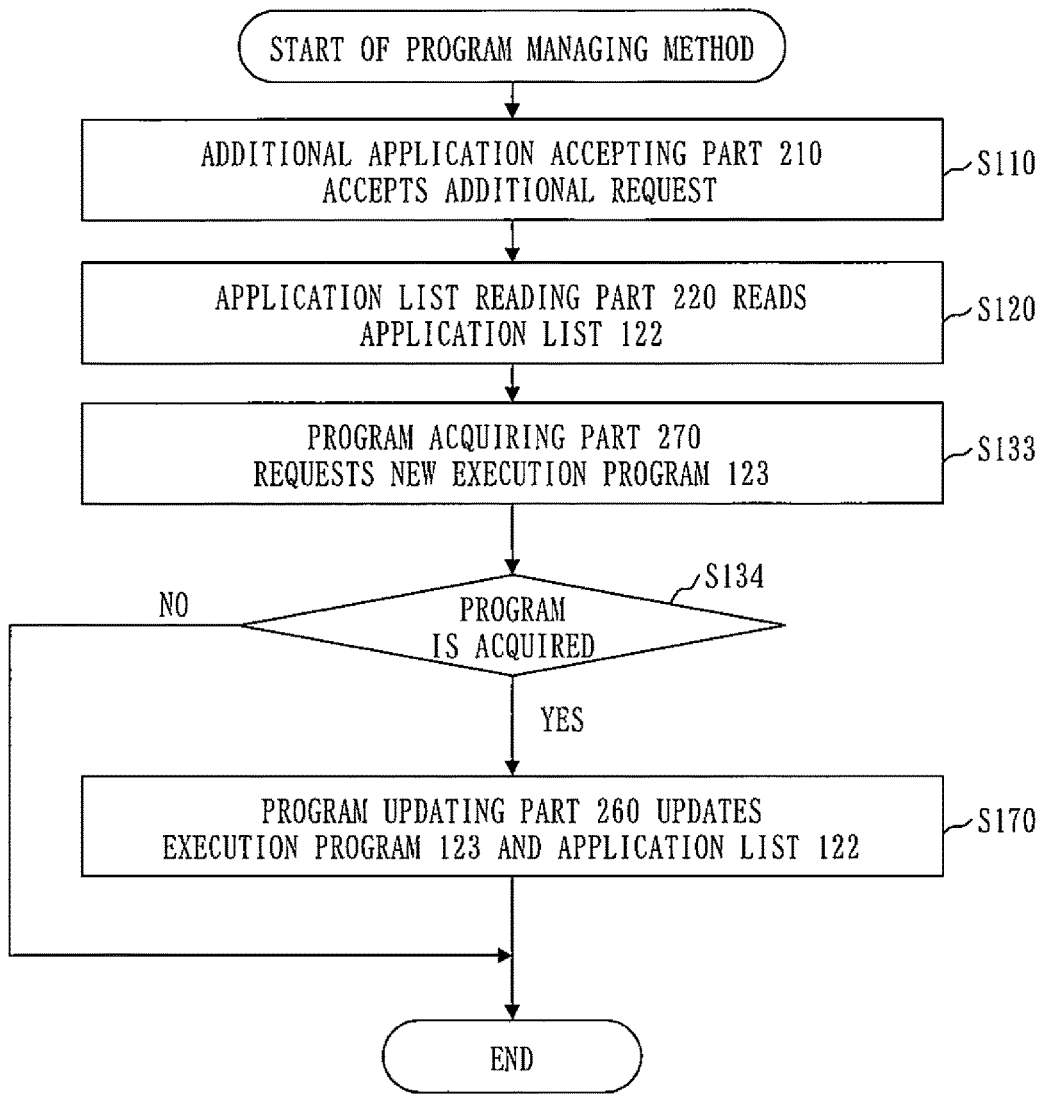
FIG. 8 is a flowchart expressing the flow of process of a program management method according to Embodiment 3.

FIG. 8 is a flowchart expressing the flow of process of a program management method according to Embodiment 3.

The program management method according to Embodiment 3 will be described with reference to FIG. 8.

The external terminal 200 executes S133 and S134 in place of S130 though S160 described in Embodiment 1 (see FIG. 3).

In S133, the program acquiring part 270 of the external terminal 200 transmits a program request for requesting the new execution program 123, to the application server 110. The program request includes the application names of the additional application and installed application constituting the new execution program 123.

The program providing part 116 of the application server 110 receives the program request from the external terminal 200.

The application collecting part 230 of the application server 110 collects the source codes 111 of the additional application and the source codes 111 of the installed application from the server memory part 119 based on the application names included in the program request.

Using the collected source codes 111, the program analyzing part 240 of the application server 110 performs program analysis concerning the new execution program 123 (the same as in Embodiment 1).

If an analysis result that a bug will not occur in the new execution program 123 is obtained, the program creating part 250 of the application server 110 creates the new execution program 123 (the same as in Embodiment 1). Then, the program providing part 116 of the application server 110 transmits the new execution program 123, and the program acquiring part 270 of the external terminal 200 receives the new execution program 123.

If an analysis result that a bug will occur in the new execution program 123 is obtained, the program providing part 116 of the application server 110 transmits an error message notifying that the new execution program 123 cannot be provided, and the program acquiring part 270 of the external terminal 200 receives the error message.

After S133, the process advances to S134.

In S134, the process branches according to the processing result of S133.

If the new execution program 123 can be obtained (YES), the process advances to S170.

If the new execution program 123 cannot be obtained, that is, if an error message is obtained (NO), an additional application accepting part 210 of the external terminal 200 displays an error message notifying that an application cannot be added, the process of the program management method ends.

Except for this, the process is the same as in Embodiment 1.

According to Embodiment 3, program analysis and program creation can be executed by the application server 110, thereby reducing the load of the external terminal 200.

Note that the process of either one of program analysis and program creation may be executed by the application server 110, the process of the other one of program analysis and program creation may be executed by the external terminal 200.

Embodiment 4.

An embodiment will be described in which program analysis concerning the new execution program 123 is performed based on the variable information on applications constituting the new execution program 123.

Matters that are different from Embodiment 1 will mainly be described hereinafter. Matters that are not described are the same as in Embodiment 1.

Figure 9:
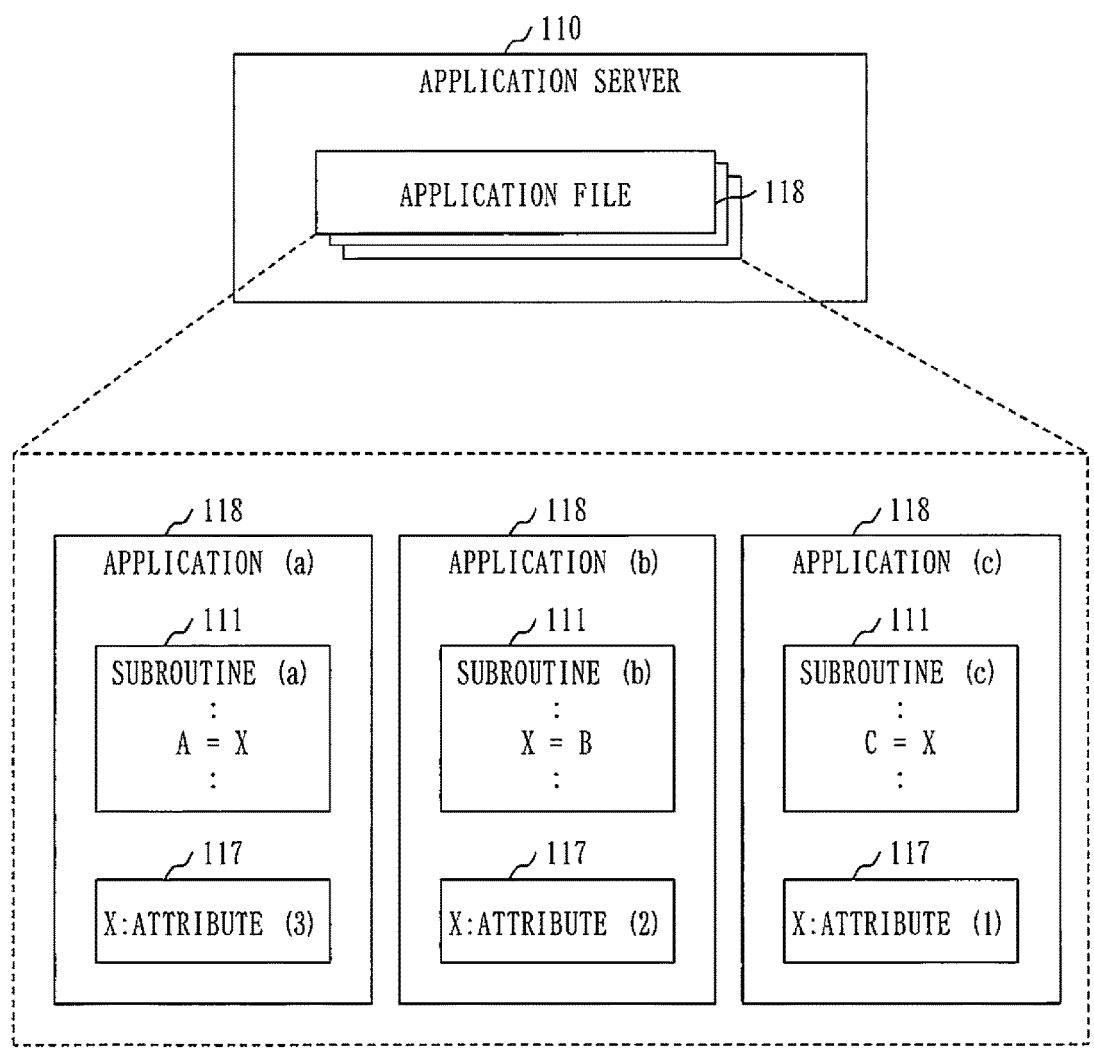
FIG. 9 is a configuration diagram of application files 118 according to Embodiment 4.

FIG. 9 is a configuration diagram of application files 118 according to Embodiment 4.

The configuration of the application files 118 according to Embodiment 4 will be described with reference to FIG. 9.

An application server 110 stores the application file 118 of each application.

Each application file 118 includes a source code 111 of the application and structural design information 117 (an example of variable information) of the application. The structural design information 117 is information on a variable used in the application.

According to Embodiment 4, the structural design information 117 correlates the name of a subroutine (also called a function) included in the source code 111 of the application, the name of the variable used in the subroutine, and the value of the attribute of the variable with each other, and indicates them.

According to Embodiment 4, note that the application server 110 stores the application files 118 of corresponding applications (a), (b), and (c).

The source code 111 of the application (a) includes a subroutine (a) which uses a variable X, and the structural design information 117 of the application (a) indicates attribute (3) as the attribute value of the variable X used in the subroutine (a).

The source code 111 of the application (b) includes a subroutine (b) which uses a variable X, and the structural design information 117 of the application (b) indicates attribute (2) as the attribute value of the variable X used in the subroutine (b).

The source code 111 of the application (c) includes a subroutine (c) which uses a variable X, and the structural design information 117 of the application (c) indicates attribute (1) as the attribute value of the variable X used in the subroutine (c).

For example, the variable X is a state variable (also called a flag) for checking a change in the internal state of an electronic control device 121 or a change in an input signal inputted to the electronic control device 121.

The attribute (1) signifies "1-cycle-delay reading attribute (also called pre-update reading attribute)", the attribute (2) signifies "writing attribute", and the attribute (3) signifies "normal-cycle reading attribute (also called post-update reading attribute)".

The 1-cycle-delay reading attribute expresses that a variable value before an update cycle lapses is to be read. In other words, the 1-cycle-delay reading attribute is an attribute for reading a pre-update variable value.

The writing attribute expresses that a variable value is to be written. In other words, the writing attribute is an attribute for updating the variable value.

The normal-cycle reading attribute expresses that a variable value after the update cycle lapses is to be read. In other words, the normal-cycle reading attribute is an attribute for reading a post-update variable value.

Figure 10:
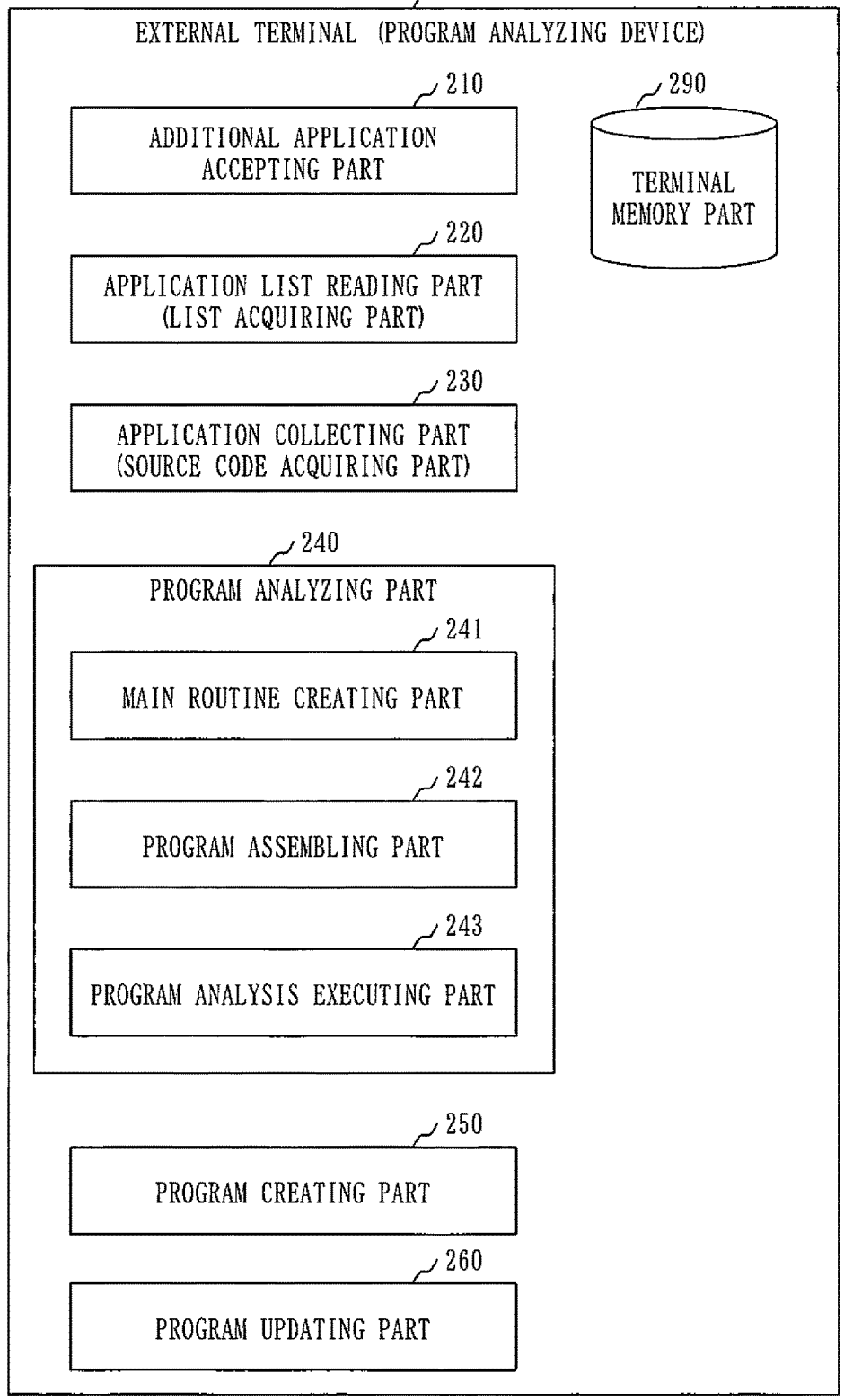
FIG. 10 is a functional configuration diagram of an external terminal 200 according to Embodiment 4.

FIG. 10 is a functional configuration diagram of an external terminal 200 according to Embodiment 4.

The functional configuration of the external terminal 200 according to Embodiment 4 will be described with reference to FIG. 10.

The external terminal 200 includes a program analyzing part 240 as has been described in Embodiment 1 (see FIG. 2).

The program analyzing part 240 includes a main routine creating part 241, a program assembling part 242, and a program analysis executing part 243.

The main routine creating part 241 creates the source code of the main routine of a new execution program 123.

The program assembling part 242 creates the source code of the new execution program 123 using the source code of the main routine, a source code 111 of an additional application, and a source code 111 of an installed application.

The program analysis executing part 243 executes program analysis at the source code of the new execution program 123.

Figure 11:
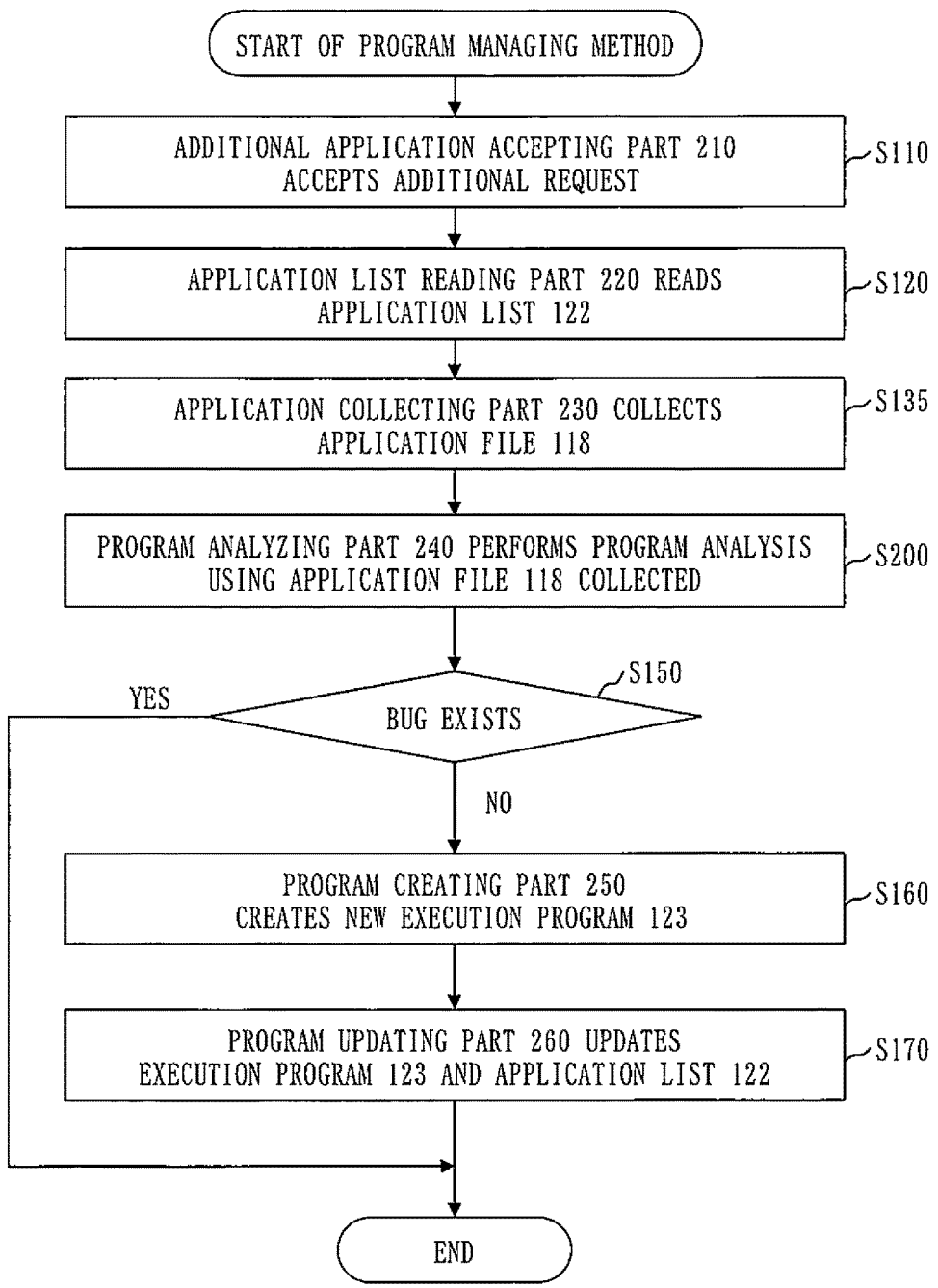
FIG. 11 is a flowchart expressing the flow of process of a program management method according to Embodiment 4.

FIG. 11 is a flowchart expressing the flow of process of a program management method according to Embodiment 4.

The program management method according to Embodiment 4 will be described with reference to FIG. 11.

The external terminal 200 executes S135 and S200 in place of S130 and S140 described in Embodiment 1 (see FIG. 3).

In S135, an application collecting part 230 collects the application files 118 (including the source codes 111) of the applications in place of the source codes 111 of the applications constituting the new execution program 123.

After S135, the process advances to S200.

In S200, the program analyzing part 240 performs program analysis concerning the new execution program 123 using the application files 118 of the applications in place of the source codes 111 of the applications.

Except for this, the process is the same as in Embodiment 1.

Figure 12:
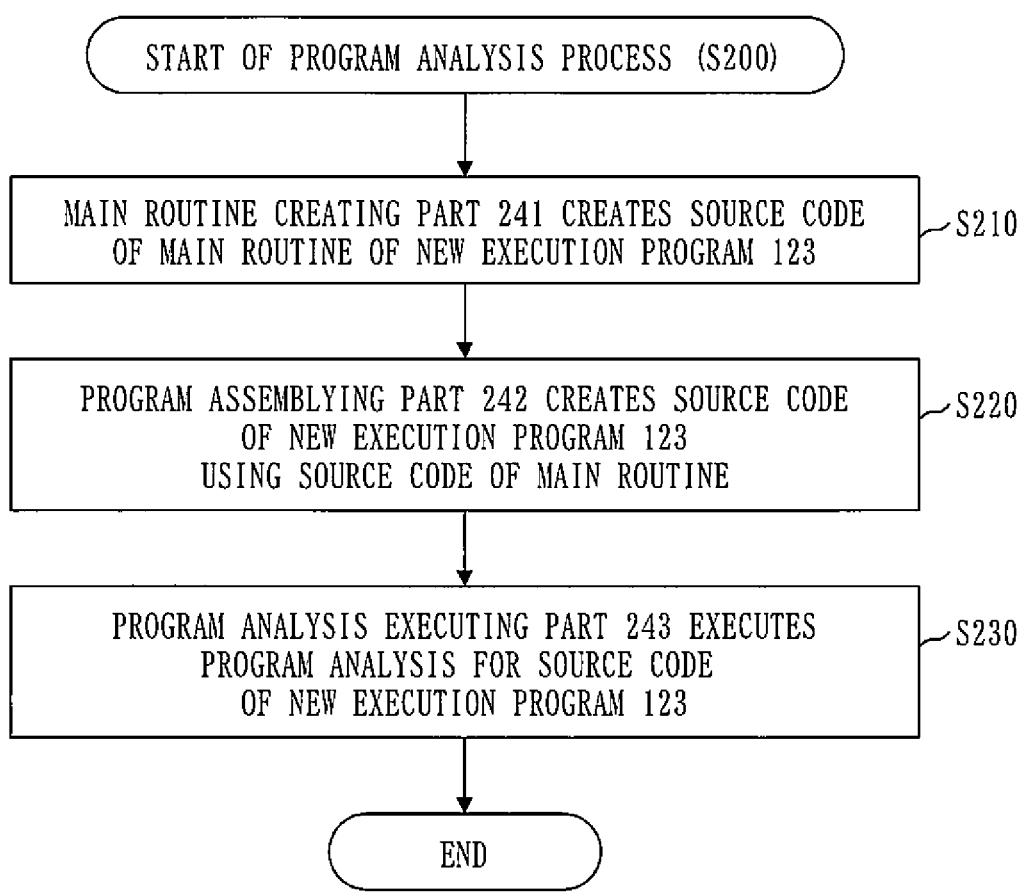
FIG. 12 is a flowchart of a program analysis process (S200) according to Embodiment 4.

FIG. 12 is a flowchart of a program analysis process (S200) according to Embodiment 4.

The program analysis process (S200) according to Embodiment 4 will be described with reference to FIG. 12.

In S210, the main routine creating part 241 creates the source code of the main routine of the new execution program 123 based on the application files 118 of the applications constituting the new execution program 123.

The main routine of the new execution program 123 is a function for calling the subroutines included in the applications in an appropriate order.

The details of the main routine creating process (S210) will be described later in detail.

After S210, the process advances to S220.

In S220, the program assembling part 242 creates the source code of the new execution program 123 using the source code of the main routine created in S210 and the source codes 111 included in the application files 118.

For example, the source code of the new execution program 123 includes the source code of the main routine, the source code 111 of the additional application, and the source code 111 of the installed application.

After S220, the process advances to S230.

In S230, the program analysis executing part 243 executes program analysis at the source code of the new execution program 123 created in S220.

For example, the program analysis executing part 243 inputs the source code of the new execution program 123 to the program analysis tool and executes the program analysis tool.

After S230, the program analysis process (S200) ends.

Figure 13:
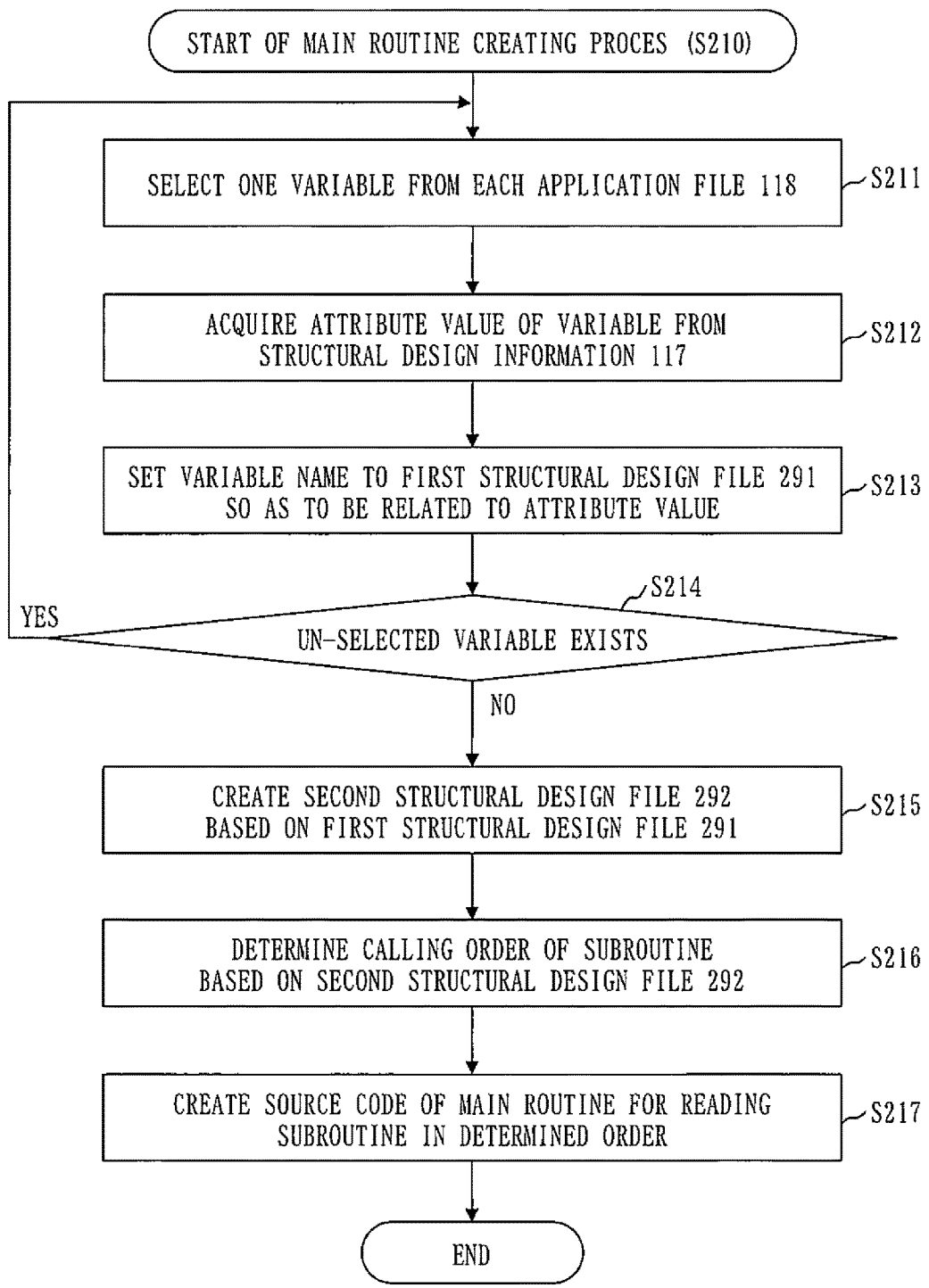
FIG. 13 is a flowchart of a main routine creating process (S210) according to Embodiment 4.

FIG. 13 is a flowchart of a main routine creating process (S210) according to Embodiment 4.

The main routine creating process (S210) according to Embodiment 4 will be described with reference to FIG. 13.

In S211, the main routine creating part 241 selects one of un-selected variables from the application files 118 of the applications constituting the new execution program 123.

For example, the main routine creating part 241 selects one of un-selected variables from the structural design information 117 included in each application file 118.

After S211, the process advances to S212.

In S212, the main routine creating part 241 selects the structural design information 117 in which the attribute value of the variable selected in S211 is set, out of the structural design information 117 included in each application file 118.

The main routine creating part 241 then acquires the attribute value of the variable selected in S211, from the structural design information 117.

For example, when the variable X used in the subroutine (a) of the application (a) is selected in S211, the main routine creating part 241 selects the structural design information 117 included in the application file 118 of the application (a). The main routine creating part 241 then acquires from the structural design information 117 an attribute value correlated with the subroutine (a) and variable X.

After S212, the process advances to S213.

In S213, the main routine creating part 241 sets the subroutine name, the variable name, and the attribute value to a first structural design file 291 such that they are correlated with each other.

Figure 14:
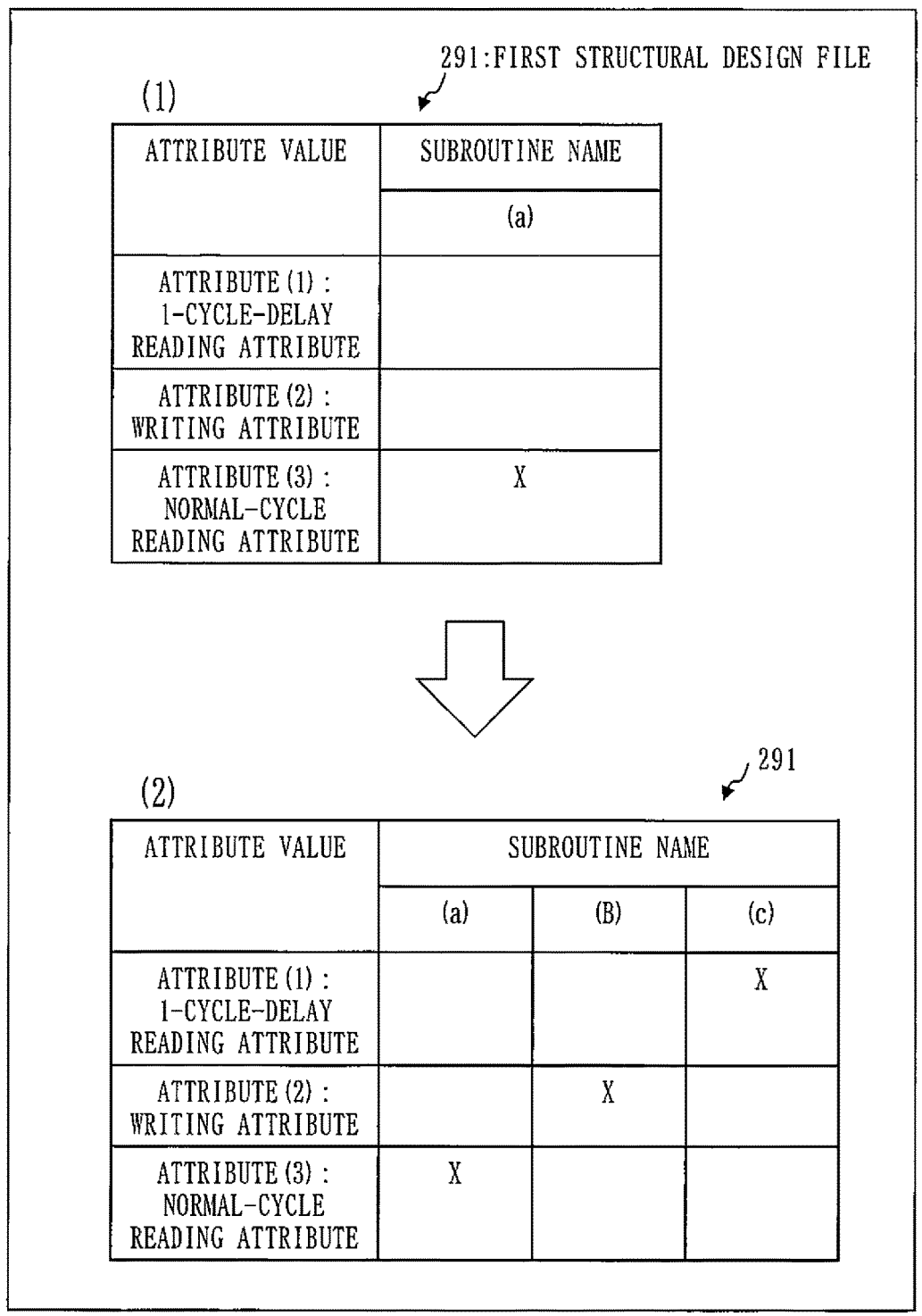
FIG. 14 is a diagram illustrating an example of a first structural design file 291 according to Embodiment 4.

For example, when the variable X of the subroutine (a) is selected in S211 and the attribute (3) is acquired in S212, the main routine creating part 241 sets the first structural design file 291 as illustrated in (1) of FIG. 14.

FIG. 14 is a diagram illustrating an example of the first structural design file 291 according to Embodiment 4.

After S213, the process advances to S214.

In S214, the main routine creating part 241 determines whether or not a variable not selected in S211 exists.

If an un-selected variable exists (YES), the process returns to S211.

If an un-selected variable does not exist (NO), the process advances to S215.

By repeating S211 through S214, for example, the first structural design file 291 illustrated in (2) of FIG. 14 is created.

In S215, the main routine creating part 241 creates a second structural design file 292 based on the first structural design file 291.

The second structural design file 292 is data in which the variable name, the attribute value of the variable, and the name of the subroutine in which the variable is used, are correlated with each other for each variable.

For example, the main routine creating part 241 creates the second structural design file 292 illustrated in FIG. 15 based on the first structural design file 291 illustrated in (2) of FIG. 14.

FIG. 15 is a diagram illustrating an example of the second structural design file 292 according to Embodiment 4.

After S215, the process advances to S216.

In S216, the main routine creating part 241 determines the calling order of the subroutines based on the second structural design file 292 created in S215.

For example, the main routine creating part 241 determines the subroutine calling order to be: a subroutine in which the variable having the attribute (1) is used, a subroutine in which the variable having the attribute (2) is used, and a subroutine in which the variable having the attribute (3) is used.

For example, the main routine creating part 241 determines a subroutine calling order "(c)→(b)→(a)" based on the second structural design file 292 illustrated in FIG. 15.

After S216, the process advances to S217.

In S217, the main routine creating part 241 creates the source code of a main routine for calling the subroutines in the calling order determined in S216.

For example, the main routine creating part 241 creates the source code of a main routine for calling the subroutines (a), (b), and (c) in the order of (c), (b), and (a).

After S217, the main routine creating process (S210) ends.

Figure 16:
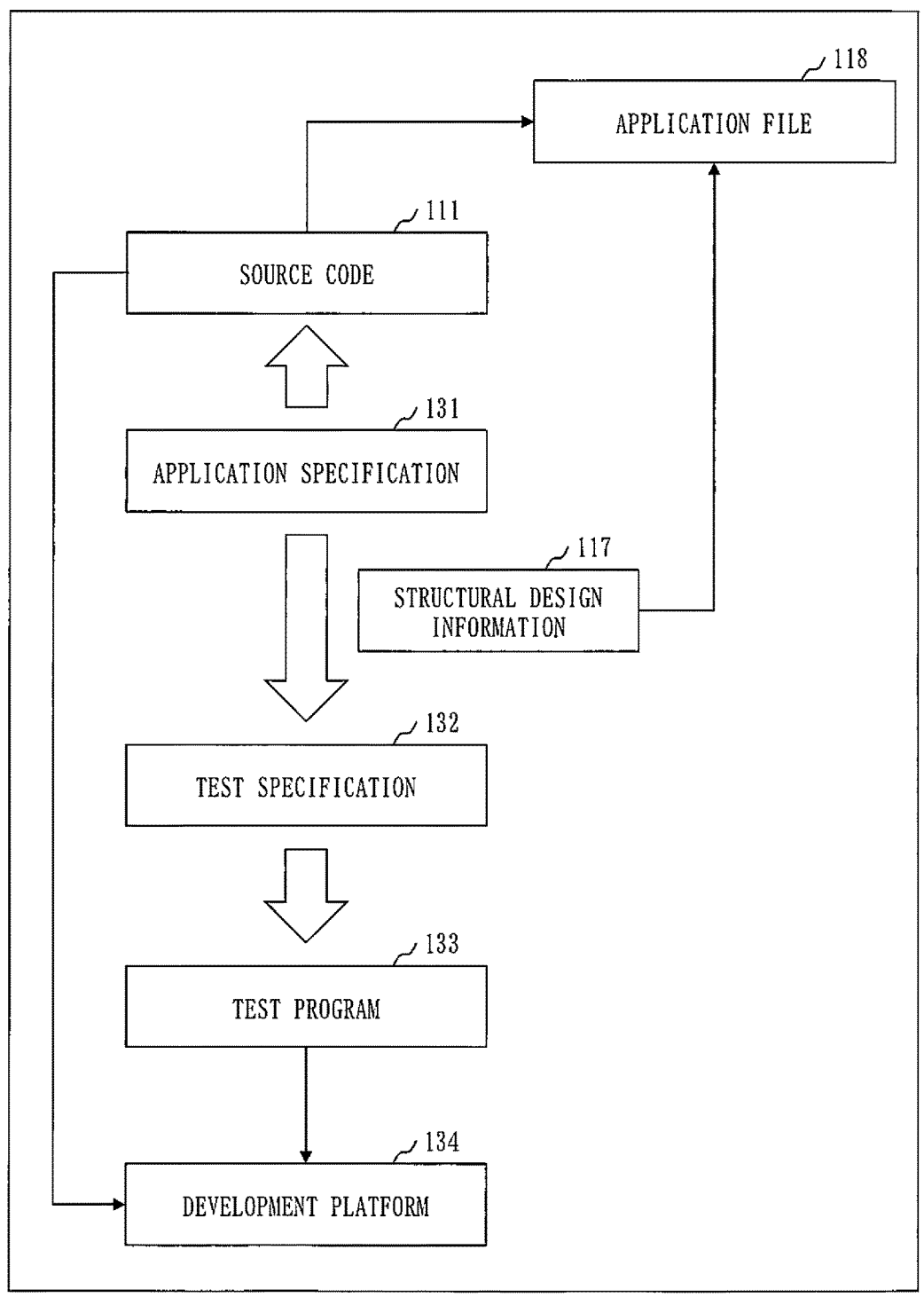
FIG. 16 is a schematic diagram indicating an application test method according to Embodiment 4.

FIG. 16 is a schematic diagram indicating an application test method according to Embodiment 4.

The application test method according to Embodiment 4 will be briefly described with reference to FIG. 16.

First, the specifications of the application are determined, and an application specification 131 is created.

The application specification 131 includes information on the variable used in the subroutine, as information concerning the subroutine included in the application.

Then, the source code 111 of the application is created based on the application specification 131.

A test specification 132 for testing the application is created based on the application specification 131. In creation of the test specification 132, the variable information of the subroutine is extracted from the application specification 131. The variable information extracted at this time of the subroutine can be used as the structural design information 117.

Then, a test program 133 for testing the application is created based on the test specification 132.

The source code 111 (or an object code obtained by compiling the source code 111) of the application is tested by execution of the test program 133. Note that the test program 133 is executed on a development platform 134.

As described above, in testing the application, the source code 111 and the structural design information 117 are obtained. More specifically, the application file 118 can be created using the source code 111 obtained when testing the application, and the structural design information 117.

According to Embodiment 4, the source code of the main routine of the new execution program 123 can be created based on the variable information of the applications constituting the new execution program 123, and the source code of the entire new execution program 123 can be created. Program analysis concerning the new execution program 123 can be performed using the source code of the entire new execution program 123.

Embodiment 5.

An embodiment will be described in which program analysis concerning the new execution program 123 is performed based on the variable information of the applications constituting the new execution program 123.

Matters that are different from Embodiment 4 will mainly be described hereinafter. Matters that are not described are the same as in Embodiment 4.

Figure 17:
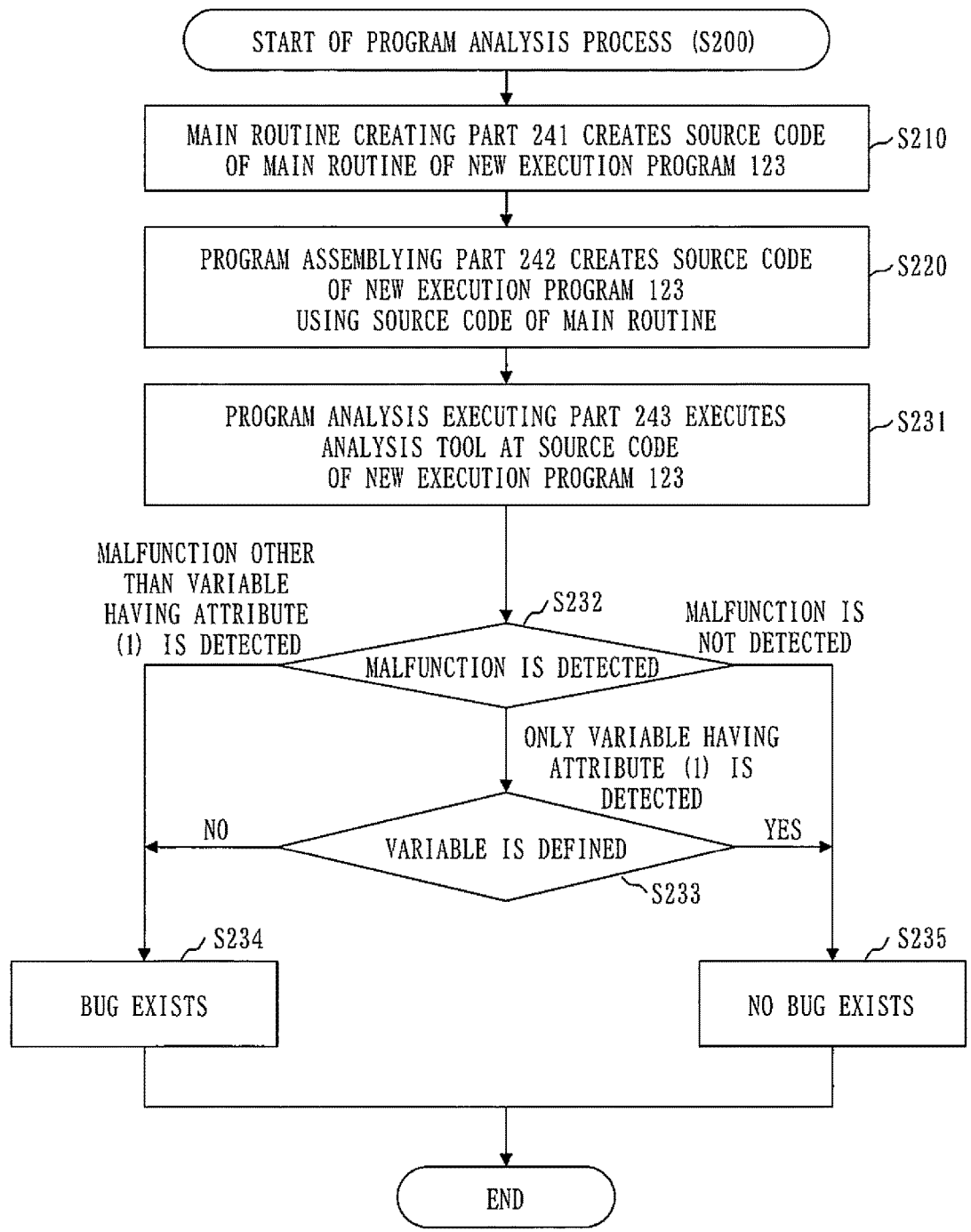
FIG. 17 is a flowchart of a program analysis process (S200) according to Embodiment 5.

FIG. 17 is a flowchart of a program analysis process (S200) according to Embodiment 5.

The program analysis process (S200) according to Embodiment 5 will be described with reference to FIG. 17.

The program analysis process (S200) includes S231 to S235 as a practical process of S230 described in Embodiment 4 (see FIG. 12).

In S231, a program analysis executing part 243 executes an analysis tool at the source code of a new execution program 123.

When a variable having attribute (1) (1-cycle-delay reading attribute) is included in the source code of the new execution program 123, the analysis tool detects (alarms) the variable having the attribute (1), as a bug of the new execution program 123.

After S231, the process advances to S232.

In S232, the program analysis executing part 243 determines whether or not a bug other than the variable having the attribute (1) is detected, based on the execution result of the analysis tool.

If only the variable having the attribute (1) is detected as the bug, the process advances to S233.

If a bug other than the variable having the attribute (1) is detected, the process advances to S234.

If no bug is detected, the process advances to S235.

In S233, the program analysis executing part 243 determines whether or not a variable detected as being a bug has been defined in the structural design information 117 of at least any one of the applications constituting the new execution program 123, as a variable having the attribute (1).

If a variable detected as being a bug has been defined as the variable having the attribute (1) (YES), the process advances to S235. In this case, the variable detected (alarmed) as being a bug would be a variable according to the design and not a bug.

If a variable detected as being a bug has not been defined as the variable having the attribute (1) (NO), the process advances to S234. In this case, the variable detected (alarmed) as being a bug would be a variable according to a design error and thus a bug.

In S234, the program analysis executing part 243 determines that the new execution program 123 has a bug.

After S234, the program analysis process (S200) ends.

In S235, the program analysis executing part 243 determines that the new execution program 123 has no bug.

After S235, the program analysis process (S200) ends.

According to Embodiment 5, whether or not a bug exists in the new execution program 123 can be determined by combining the analysis result of the analysis tool and the structural design information 117.

Embodiment 6.

An embodiment will be described where there is a subroutine that uses a plurality of variables having different attributes and the subroutine is included in the new execution program 123.

Matters that are different from Embodiment 4 or 5 will mainly be described hereinafter. Matters that are not described are the same as in Embodiment 4 or 5.

An external terminal 200 includes a main routine creating part 241, as described in Embodiment 4 (see FIG. 10).

The main routine creating part 241 creates the source code of the main routine of a new execution program 123, as described in Embodiment 4 (see FIG. 13).

Note that the main routine creating part 241 determines the order of the subroutines to be called in the main routine, as follows (S216).

FIG. 18 is a diagram illustrating an example of a first structural design file 291 according to Embodiment 6.

FIG. 19 is a diagram illustrating an example of a second structural design file 292 according to Embodiment 6.

FIG. 20 is a diagram illustrating an example of a third structural design file 293 according to Embodiment 6.

The third structural design file 293 is data in which the variable name, one or a plurality of attribute values, and the name of the subroutine in which the variable is used, are correlated with each other for each variable.

Note that the first structural design file 291 illustrated in FIG. 18 has been created in S211 through S214 (see FIG. 13).

In S215, the main routine creating part 241 creates the second structural design file 292 illustrated in FIG. 19 based on the first structural design file 291 illustrated in FIG. 18.

The second structural design file 292 illustrated in FIG. 19 expresses that a variable X and a variable Y are used in a subroutine (e) and that attribute (2) of the variable X and attribute (3) of the variable Y differ.

In S216 (see FIG. 13), the main routine creating part 241 determines whether or not there is a subroutine in which a plurality of variables having different attributes are used, by looking up the second structural design file 292.

In the second structural design file 292 illustrated in FIG. 19, the subroutine (e) corresponds to a subroutine in which a plurality of variables having different attributes are used.

If there is no corresponding subroutine, the main routine creating part 241 determines the subroutine calling order based on the second structural design file 292 (in the same manner as in Embodiment 4).

If there is a corresponding subroutine, the main routine creating part 241 creates the third structural design file 293 based on the second structural design file 292. The main routine creating part 241 then determines the subroutine calling order based on the third structural design file 293.

For example, the main routine creating part 241 creates the third structural design file 293 illustrated in FIG. 20 based on the second structural design file 292 illustrated in FIG. 19.

More specifically, the main routine creating part 241 creates the third structural design file 293 (see FIG. 20) by correlating the subroutine (e) with the combination "attribute (2)/(3)" of the attribute (2) and attribute (3). This is because the subroutine (e) is set in the second structural design file 292 (see FIG. 19) in correlation with both the attribute (2) and attribute (3).

The main routine creating part 241 then determines the subroutine calling order to be: a subroutine correlated with the attribute (1), a subroutine correlated with the attribute (1)/(2), a subroutine correlated with the attribute (2), a subroutine correlated with the attribute (2)/(3), and a subroutine correlated with the attribute (3).

More specifically, the main routine creating part 241 determines a subroutine calling order "(c)→(d)→(b)→(e)→(a)". Note that the places in the order of the subroutines (c) and (d) may be interchanged since they are both correlated with the attribute (1).

According to Embodiment 6, the subroutine calling order can be determined even when the subroutine uses a plurality of variables having different attributes.

Embodiment 7.

An embodiment will be described in which subroutine calling is not established theoretically.

Matters that are different from Embodiment 4 or 5 will mainly be described hereinafter. Matters that are not described are the same as in Embodiment 4 or 5.

Figure 21:
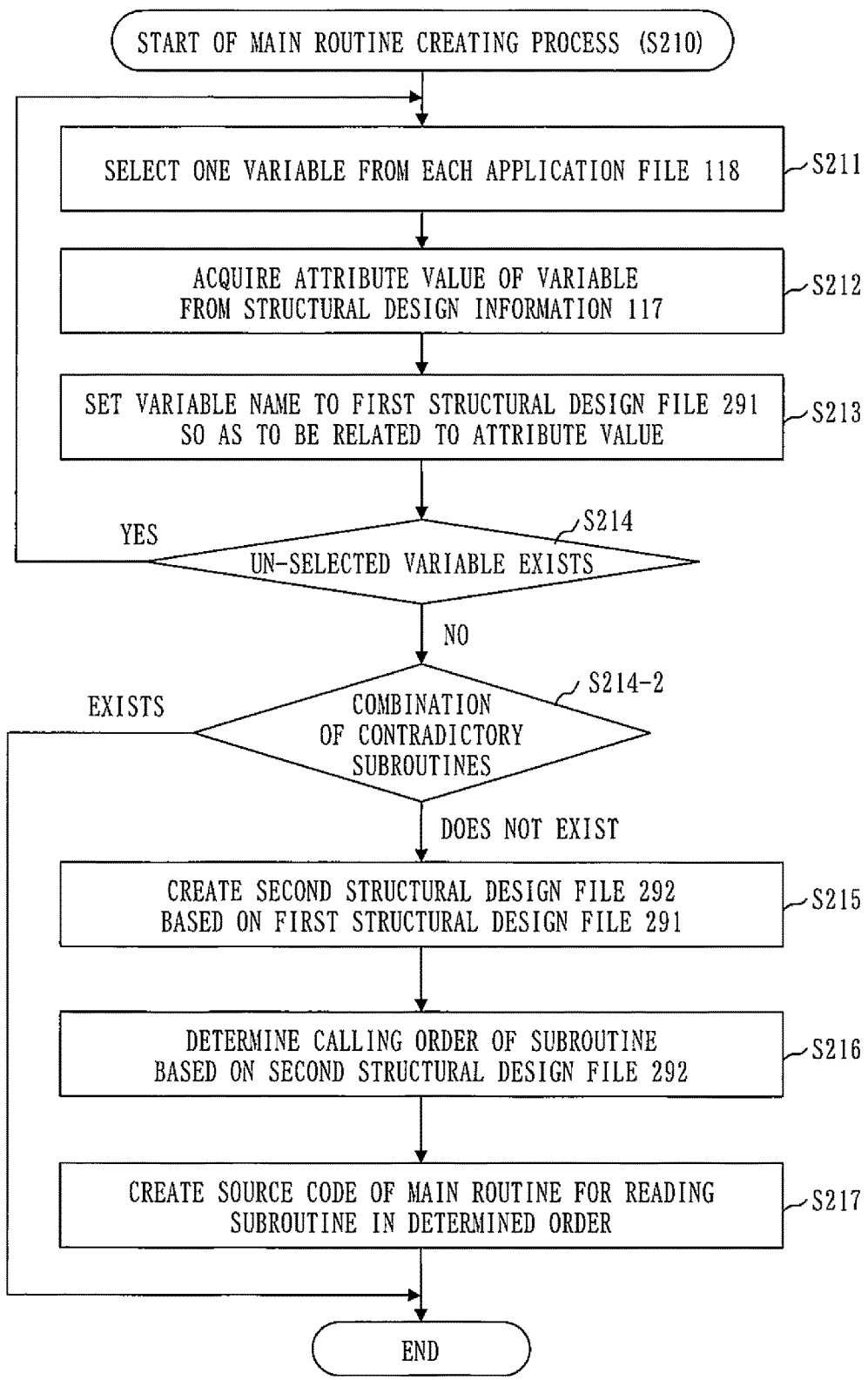
FIG. 21 is a flowchart of a main routine creating process (S210) according to Embodiment 7.

FIG. 21 is a flowchart of a main routine creating process (S210) according to Embodiment 7.

The main routine creating process (S210) according to Embodiment 7 will be described with reference to FIG. 21.

The main routine creating process (S210) includes S214-2 in addition to the process described in Embodiment 4 (FIG. 13).

From S211 through S214, a main routine creating part 241 creates a first structural design file 291 of a new execution program 123.

After S214, the process advances to S214-2.

In S214-2, the main routine creating part 241 determines whether or not there is a combination of subroutines having contradictory calling orders, based on the first structural design file 291.

A combination of the subroutines having contradictory calling orders is a combination that includes two subroutines as follows.

The two subroutines use a first variable and a second variable.

The second variable used in one subroutine has an attribute that is correlated with a "lower" calling order than that of the attribute of the first variable used in one subroutine.

The second variable used in the other subroutine has an attribute that is correlated with a "higher" calling order than that of the attribute of the first variable used in the other subroutine.

If there is a combination of subroutines having contradictory calling orders, the main routine creating part 241 does not create a main routine, and the main routine creating process (S210) ends. In this case, a program analysis executing part 243 does not perform program analysis, and determines that the new execution program 123 has a bug.

If there is no combination of subroutines having contradictory calling orders, the process advances to S215. S215 to S217 are the same as in Embodiment 4.

FIG. 22, FIG. 23, and FIG. 24 are diagrams illustrating examples of a first structural design file 291 according to Embodiment 7.

When a first structural design file 291 as illustrated in FIGS. 22 to 24 is created, the main routine creating part 241 determines that there is a combination of subroutines having contradictory calling orders. In the first structural design file 291 of FIGS. 22 to 24, a calling order corresponding to attribute (1) is the first place, a calling order corresponding to attribute (2) is the second place, and a calling order corresponding to attribute (3) is the third place.

In the first structural design file 291 illustrated in FIG. 22, a subroutine (e) uses a variable Y having attribute (2) and a variable X having attribute (3). Namely, the variable X has the attribute (3) correlated with a "lower" calling order than the attribute (2) of the variable Y.

A subroutine (f) uses a variable Y having attribute (3) and a variable X having attribute (2). Namely, the variable X has the attribute (2) correlated with a "higher" calling order than the attribute (3) of the variable Y.

Accordingly, the subroutine (e) and the subroutine (f) have contradictory calling orders. Also when the attribute of the variable X used in the subroutine (f) is attribute (1), the calling orders are contradictory.

The same applies to the first structural design file 291 illustrated in FIG. 23 or FIG. 24.

According to Embodiment 7, the main routine creating part 241 may create a second structural design file 292 based on the first structural design file 291 (S215), and determine whether or not a combination of contradictory subroutines exists based on the second structural design file 292 (S214-2).

According to Embodiment 7, a combination of subroutines having contradictory calling orders can be detected.

The embodiments are examples of the program management system 100 and external terminal 200.

More specifically, the program management system 100 and external terminal 200 need not include part of the function or configuration described in the embodiments.

The program management system 100 and external terminal 200 may include a function or configuration not described in the embodiments.

The embodiments may be combined partly or entirely within a range where a contradiction does not arise.

REFERENCE SIGNS LIST

100: program management system; 110: application server; 111: source code; 112: analysis result table; 113: source code request receiving part; 114: analysis result searching part; 115: source code responding part; 116: program providing part; 117: structural design information; 118: application file; 119: server memory part; 120: vehicle; 121: electronic control device; 122: application list; 123: execution program; 131: application specification; 132: test specification; 133: test program; 134: development platform; 200: external terminal; 210: additional application accepting part; 220: application list reading part; 230: application collecting part; 240: program analyzing part; 241: main routine creating part; 242: program assembling part; 243: program analysis executing part; 250: program creating part; 260: program updating part; 270: program acquiring part; 290: terminal memory part; 291: first structural design file; 292: second structural design file; 293: third structural design file; 901: arithmetic device; 902: auxiliary memory device; 903: main memory device; 904: communication device; 905: input/output device; 909: bus

The invention claimed is:

1. A program analysis device comprising:
a hardware processor to execute a program analysis program; and
a memory to store the program analysis program which, when executed by the processor, results in automatic performance of steps comprising
acquiring, from a first location, a partial program list indicating a partial program which constitutes an execution program installed in a program-executing device at said first location, acquiring a source code of the partial program indicated by the acquired partial program list, and a source code of a new partial program to be added to the execution program, from a server at a second location, acquiring variable information concerning a variable used in the partial program, and variable information concerning a variable used in the new partial program, and determining whether or not a bug will occur in a new execution program that includes the new partial program, using the acquired source code of the partial program and the acquired source code of the new partial program, wherein the variable information on the partial program identifies a variable to be used in a subroutine constituting the partial program as one of: a variable having a pre-update reading attribute for reading a pre-update variable value, a variable having a writing attribute for updating a variable value, and a variable having a post-update reading attribute for reading a post-update variable value, wherein the variable information on the new partial program identifies a variable to be used in a subroutine constituting the new partial program as one of: a variable having the pre-update reading attribute, a variable having the writing attribute, and a variable having the post-update reading attribute, and wherein the program analysis program results in automatic performance of steps comprising determining an order in which the subroutine of the partial program and the subroutine of the new partial program are to be called, based on the variable information on the partial program and the variable information on the new partial program, creating a source code of a main routine that calls the subroutine of the partial program and the subroutine of the new partial program in the order determined, and creating the source code of the new execution program using the source code of the main routine, the source code of the partial program, and the source code of the new partial program.

2. The program analysis device according to claim 1, wherein the program analysis program results in performance of determining whether or not a bug will occur in the new execution program, by executing a program analysis tool at the source code of the new execution program.

3. The program analysis device according to claim 1, wherein the main routine calls the subroutine of the partial program and the subroutine of the new partial program, in an order of: a subroutine that uses a variable having the pre-update reading attribute; a subroutine that uses a variable having the writing attribute; and a subroutine that uses a variable having the post-update reading attribute.

4. The program analysis device according to claim 2, wherein the program analysis program results in performance of steps comprising extracting a variable having the pre-update reading attribute from the source code of the execution program by executing the program analysis tool, and when the extracted variable is not indicated by at least either one of the variable information of the partial program and the variable information of the new partial program, as being a variable having the pre-update reading attribute, determining that a bug will occur in the new execution program.

5. The program analysis device according to claim 2, wherein the variable information of the partial program indicates an attribute of each variable used in a subroutine constituting the partial program, wherein the variable information of the new partial program indicates an attribute of each variable used in a subroutine constituting the new partial program, and wherein, when the subroutine of the partial program and the subroutine of the new partial program use a first variable and a second variable, the second variable used in one subroutine having an attribute correlated with a lower calling order than an attribute of the first variable used in said one subroutine, the second variable used in the other subroutine having an attribute correlated with a higher calling order than an attribute of the first variable used in said other subroutine, the program analysis program results in performance of steps comprising determining that a bug will occur in the new execution program regardless of whether or not the source code of the new execution program is created.

6. The program analysis device according to claim 1, wherein the program analysis program, if having already made a determination of a past execution program constituted by a combination of partial programs that are the same as the partial program and the new partial program, results in performance of steps comprising making a determination of the new execution program based on a determination result of the past program.

7. The program analysis device according to claim 1, wherein the program analysis program results in performance of steps comprising creating the new execution program if it is determined that a bug will not occur in the new execution program, and updating the execution program with the created new execution program and adds a program name of the new partial program to the partial program list.

8. The program analysis device according to claim 1, wherein said first location is a vehicle.

9. A program analysis method which uses a program analysis device, the program analysis method comprising automatic performance by the program analysis device of:

acquiring, from a first location, a partial program list indicating a partial program which constitutes an execution program installed in a program-executing device at said first location;

acquiring a source code of the partial program indicated by the acquired partial program list, and a source code of a new partial program to be added to the execution program, from a server at a second location;

acquiring variable information concerning a variable used in the partial program, and variable information concerning a variable used in the new partial program; and determining whether or not a bug will occur in a new execution program that includes the new partial program, using the acquired source code of the partial program and the acquired source code of the new partial program, wherein the variable information on the partial program identifies a variable to be used in a subroutine constituting the partial program as one of: a variable having a pre-update reading attribute for reading a pre-update variable value, a variable having a writing attribute for updating a variable value, and a variable having a post-update reading attribute for reading a post-update variable value, wherein the variable information on the new partial program identifies a variable to be used in a subroutine constituting the new partial program as one of: a variable having the pre-update reading attribute, a variable having the writing attribute, and a variable having the post-update reading attribute, and wherein the program analysis method further comprises automatic performance by the program analysis device of:

determining an order in which the subroutine of the partial program and the subroutine of the new partial program are to be called, based on the variable information on the partial program and the variable information on the new partial program, creating a source code of a main routine that calls the subroutine of the partial program and the subroutine of the new partial program in the order determined, and creating the source code of the new execution program using the source code of the main routine, the source code of the partial program, and the source code of the new partial program.

10. A non-transitory computer readable medium on which is stored a program analysis program which, when executed by a computer, causes the computer to perform the program analysis method according to claim 9.

11. The program analysis method according to claim 9, wherein said first location is a vehicle.

\* \* \* \* \*